US005395466A

United States Patent [19]

Tukagoshi et al.

[11] Patent Number: 5,395,466

[45] Date of Patent: Mar. 7, 1995

[54] BACK PASTING APPARATUS AND METHOD

[75] Inventors: Kouichi Tukagoshi; Takuya Kitamura; Kiyoto Fujii; Kazuo Higuchi; Shinji Imai; Kazuhiko Kitagawa, all of Tokyo, Japan

[73] Assignee: Max Co., Ltd., Tokyo, Japan

[21] Appl. No.: 86,847

[22] Filed: Jul. 7, 1993

[30] Foreign Application Priority Data

| | | | |
|---|---|---|---|
| Jul. 7, 1992 | [JP] | Japan | 4-047353 U |
| Oct. 2, 1992 | [JP] | Japan | 4-068973 U |
| Oct. 14, 1992 | [JP] | Japan | 4-071721 U |
| Oct. 14, 1992 | [JP] | Japan | 4-071722 U |
| Oct. 20, 1992 | [JP] | Japan | 4-073169 U |
| Oct. 23, 1992 | [JP] | Japan | 4-074213 U |

[51] Int. Cl.[6] .......... B32B 3/04

[52] U.S. Cl. .......... 156/212; 156/216; 156/247; 156/344; 156/353; 156/360; 156/468; 156/475; 156/479; 156/486; 156/492; 100/33 R

[58] Field of Search .......... 156/202, 212, 216, 247, 156/344, 353, 360, 517, 521, 540, 584, 468, 475, 479, 482, 486, 492, 908; 100/33 R

[56] References Cited

U.S. PATENT DOCUMENTS

| | | | |
|---|---|---|---|
| 3,953,277 | 4/1976 | Kuhns | 156/360 |
| 4,182,645 | 1/1980 | Hill | 156/540 X |
| 4,537,646 | 8/1985 | Hoyle | 156/212 |
| 4,840,696 | 6/1989 | Krasuski et al. | 156/353 |
| 5,259,681 | 11/1993 | Kitazawa et al. | 156/584 X |

FOREIGN PATENT DOCUMENTS 51-57710 4/1976 Japan .

*Primary Examiner*—David A. Simmons
*Assistant Examiner*—Paul M. Rivard
*Attorney, Agent, or Firm*—Cushman, Darby & Cushman

[57] ABSTRACT

A back pasting apparatus which uses a back pasting adhesive tape and is intended to make the apparatus compact and to improve back pasting quality. A guide rail (16) movable back and forth with respect to a frame (14) is provided. A paper table (15) arranged opposite to the guide rail (16) is biased by a spring or the like in the direction of the guide rail (16). The guide rail (16) and a clamp (22) are driven by a drive mechanism. First, a back pasting adhesive tape (30) is fed by a tape feeder into the guide groove (19) of the guide rail (16). As the clamp (22) lowers, the cover of papers (17) is pressed against the adhesive tape (30). The guide rail (16) is moved down along the grooves (20, 20) before being moved forward. As a result, only the paper table (15) is pressed down and moved back so that the adhesive tape (30) is pressed against the back and back cover of the papers (17).

15 Claims, 16 Drawing Sheets

BACK PASTING APPARATUS AND METHOD

BACKGROUND OF THE INVENTION

The present invention relates to a back pasting apparatus and method for binding papers and the like by back pasting particularly with an adhesive tape.

There are known back pasting apparatus for binding papers with back pasting paper and adhesive cloth tapes. A back pasting apparatus of this sort is used for binding papers 1 through the consecutive steps of binding the papers 1 with a stapler or the like first, sticking an adhesive tape 4 to the margin of a cover on one side and, as shown in FIG. 30, moving the binding portion of the papers 1 along guide plates 2, 3 so as to glue the adhesive tape 4 to the back of the papers 1 and the margin of the back cover thereof.

As shown in FIG. 30, each of the guide plates 2, 3 is formed by bending one triangular side of a plate perpendicular to its rectangular portion. The papers 1 with the adhesive tape 4 sticking thereto are made to abut against the guide plates 2, 3 and slid thereon, so that the slopes 5, 6 of the respective guide plates 2, 3 bend the adhesive tape 4 and press it against the papers 1.

Since such a conventional back pasting apparatus is used for back pasting by forcing the back of papers to adhere to guide plates and moving the papers in the longitudinal direction, the width the apparatus will have to be designed in consideration of the quantity of movement of the papers. This makes it difficult to reduce the size of the apparatus.

Moreover, a problem arising from a series of processes including bending a back pasting adhesive tape and sticking it to the back of papers while stroking it in the longitudinal direction is that the adhesive tape tends to crinkle and twist, thus making the finishing unsatisfactory.

As the guide plates are used to press the adhesive tape against the back of papers, the back of papers may be lined disorderly at the time the adhesive tape is pressed thereto provided the number of sheets of paper is small. The problem in this case is that back pasting is impossible unless a stack of paper is thick to a certain extent.

SUMMARY OF THE INVENTION

An object of the present invention made to solve the foregoing problems is to provide a back pasting apparatus capable of not only meeting the demand of improving the quality of a finished work but also back pasting, irrespective of the number of sheets of paper, with the effect of improving space efficiency by rendering the apparatus compact.

The back pasting apparatus 11 proposed to accomplish the object stated above according to the present invention comprises frames 13, 14 uprightly fitted to a base 12; a paper table 15 and a guide rail 16 installed between the frames 13, 14; a back pasting adhesive tape guide groove 19 provided for the guide rail 16 in the longitudinal direction; the guide groove 19 being arranged opposite to the front edge of the paper table 15, the guide rail 16 and the paper table 15 being movable back and forth, at least one of the guide rail 16 and the paper table 15 being movable up and down; a drive mechanism 21 for situating the guide rail 16 and the paper table 15 at the same level by moving up and down one of the guide rail 16 and the paper table 15 held lower than the guide rail 16 and for moving the guide rail 16 forward; and a clamp 22 installed above the paper table 15, the clamp 22 being freely pressed against the paper table 15, wherein an adhesive tape 30 is made to stick to the back of papers 17 and the margin of the back cover thereof through the steps of holding one side edge of the adhesive tape 30 in the guide groove 19 of the guide rail 16, pressing the other side edge of the adhesive tape 30 against the other side edge of the cover of papers 17 on the paper table 15 by means of the clamp 22, and moving the guide rail 16 forward after relatively lowering the guide rail 16.

When the margins of the papers to be bound are set in such a way as to line up at the front edge of the paper table, the adhesive tape held in the guide groove of the guide rail opposite to the paper table is located above the binding margin of the cover of the papers. As the clamp lowers, part of the adhesive tape is pressed against the cover. By lowering the guide rail or raising the paper table, the adhesive tape with one side edge held by the guide rail is made to stick to the back of the papers. When the guide rail is subsequently moved forward, the paper table is forced to move back thereby. However, the papers pressed down by the clamp are restrained from moving back and the leading end of the guide rail presses the remaining part of the adhesive tape against the margin of the back cover of the papers.

DETAILED DESCRIPTION OF THE PREFERRED EMBODIMENTS

Figure 1:
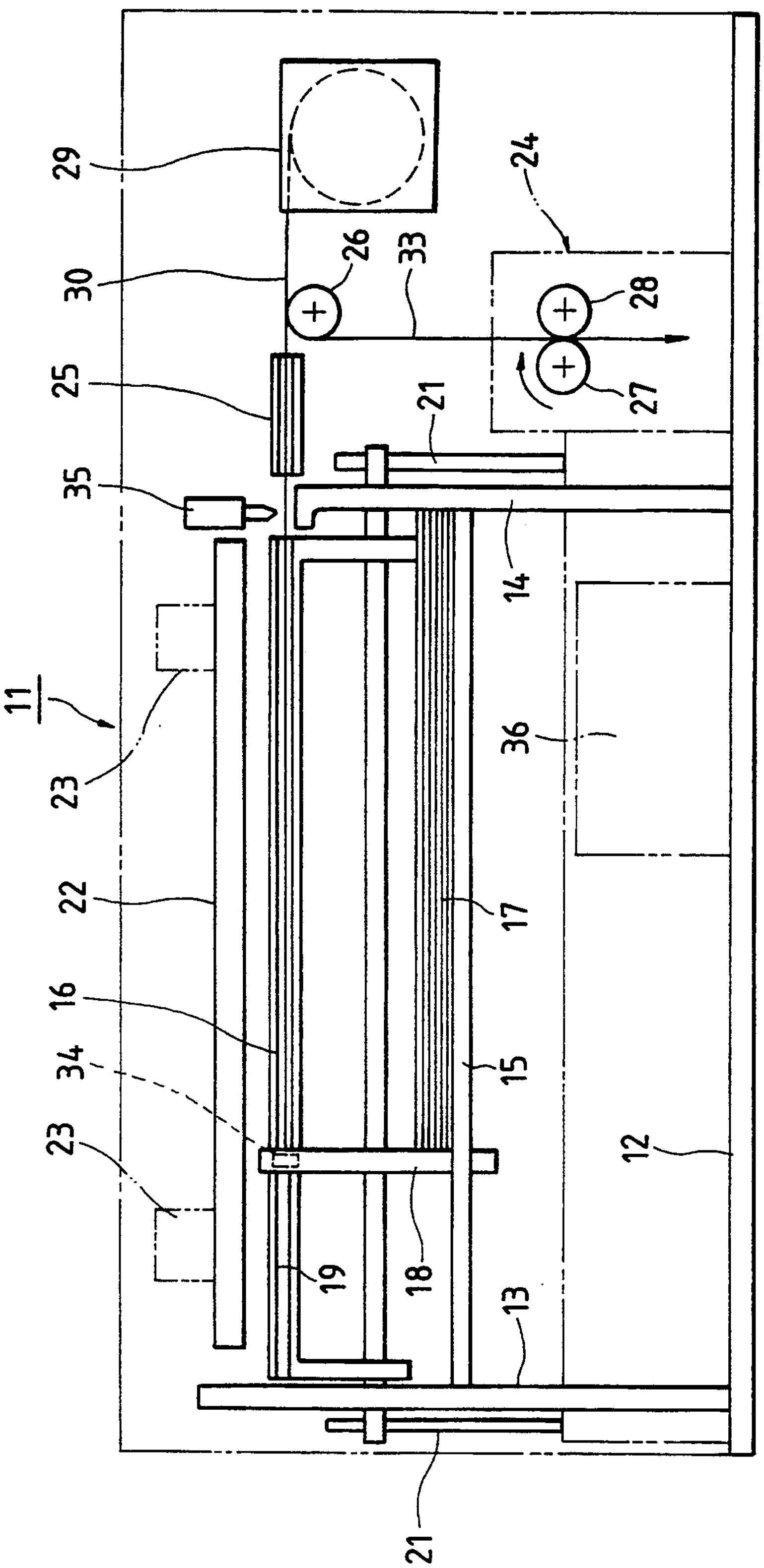
FIG. 1 is an elevational view of a back pasting apparatus according to the first embodiment of the present invention.

Referring to the accompanying drawings, an embodiment of the present invention will subsequently be described. FIG. 1 illustrates a back pasting apparatus 11, wherein numeral 12 denotes a base. A paper table 15 and a guide rail 16 are fitted to both left- and right-hand frames 13, 14 fixedly fitted to the base 12, and a positioning guide plate 18 for paper 17 is slidably fitted to the paper table 15. As shown in FIGS. 2 to 5, the paper table 15 is so installed as to longitudinally slide in a predetermined range with respect to the frames 13, 14 and is simultaneously biased backward (to the left in FIG. 2) by a spring (not shown).

The guide rail 16 arranged behind the paper table 15 is provided with a guide groove 19 in the front portion opposite to the paper table 15, movable vertically and longitudinally with respect to the frames and driven by a guide rail drive mechanism 21 shown in FIG. 1. The guide rail drive mechanism 21 may be linked with a motor or otherwise may utilize such a means as a solenoid actuator.

A clamp 22 is arranged above the rear edge of the paper table 15 and driven by a clamp drive mechanism 23. The clamp 22 is moved down from the position shown in FIG. 2 during a back pasting process as will be described later so as to hold papers between the clamp 22 and the paper table 15.

A tape feeder 24 is provided in the lateral direction of the guide rail 16 and the paper table 15. The tape feeder 24 comprises a fixed guide rail 25, a guide roller 26, a capstan roller 27, an idler roller 28 and a motor (not shown).

Figure 6:
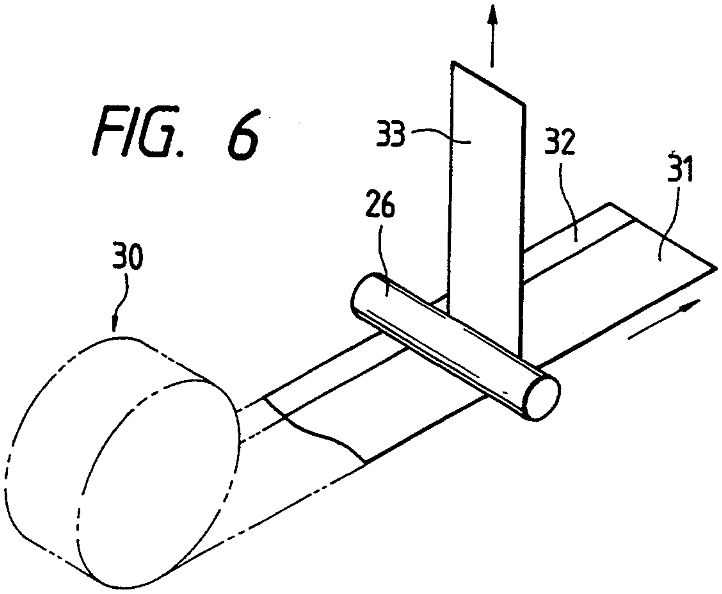
FIG. 6 is a perspective view of a back pasting tape.

A long back pasting adhesive tape 30 accommodated in a tape holder 29 has two kinds of back paper 32, 33 pasted on an adhesive layer 31 as shown in. FIG. 6. The ratio of width of narrow back paper 32 to that of wide back paper 33 is set at 1 to 2. The narrow back paper 32 is arranged opposite to the guide rail 16 and the wide paper 33 opposite to the paper table 15 in such a state that the tape holder 29 is loaded with both of them.

The leading end of the adhesive tape 30 is taken out of the tape holder 29 and only the wide back paper 33 is peeled off the adhesive tape 30. Then the direction of the wide back paper 33 is turned by the guide roller 26 and the wide back paper 33 is inserted in between the capstan roller 27 and the idler roller 28. The leading end of the adhesive tape 30 is fitted via the fixed guide rail 25 into the guide groove 19 of the guide rail 16 so as to drive the capstan roller 27. The adhesive tape 30 together with the back paper 32, 33 is then taken out of tape holder 29 and the wide back paper 32 is separated from the adhesive tape 30 at the position of the guide roller 26. The adhesive tape 30 with the narrow back paper 32 sticking thereto is thus conveyed in the guide groove 19 of the guide rail 16. As the portion to which narrow back paper 32 has been pasted is conveyed in the guide groove 19, the exposed adhesive layer 31 of the adhesive tape 30 is prevented from adhering to the guide rail 16, whereby the adhesive tape 30 is allowed to smoothly travel therein.

Moreover, the guide plate 18 fitted to the paper table 15 is furnished with a tape detection sensor 34 such as a photosensor and a cutter 35 is also provided above the frame 14 on the fixed guide rail side 25 so as to conform the cutting position of the adhesive tape 30 by means of the cutter 35 to the inner surface of the frame 14. The cutter 35 is controlled by a control unit in accordance with the value detected by the tape detection sensor 34. The adhesive tape 30 is thus cut to dimensions of the paper 17.

The operation of the back pasting apparatus 11 will subsequently be described. A series of operations covering the feeding of the adhesive tape 30 up to the completion of back pasting are sequentially controlled by the control unit 36. First, sheets of paper 17 such as documents are temporarily bound with a stapler and the portion thus temporarily bound is adjusted to the rear edge of the paper table 15 before being mounted thereon. Then the guide table 18 is made to abut against the leftmost side of the papers 17 as shown in FIG. 1. When an instruction for the start of the operation is given to the control unit 36 via a start switch (not shown), the capstan roller 27 is driven so as to feed into the guide groove 19 of the guide rail 16 the adhesive tape 30 with the narrow back paper 32 sticking thereto. When the leading end of the adhesive tape 30 reaches the position of the tape detection sensor 34, the control unit 36 stops the driving of the capstan roller 27 and by causing the cutter 35 to operate, the adhesive tape 30 is cut to dimensions of the papers 17.

Figure 2:
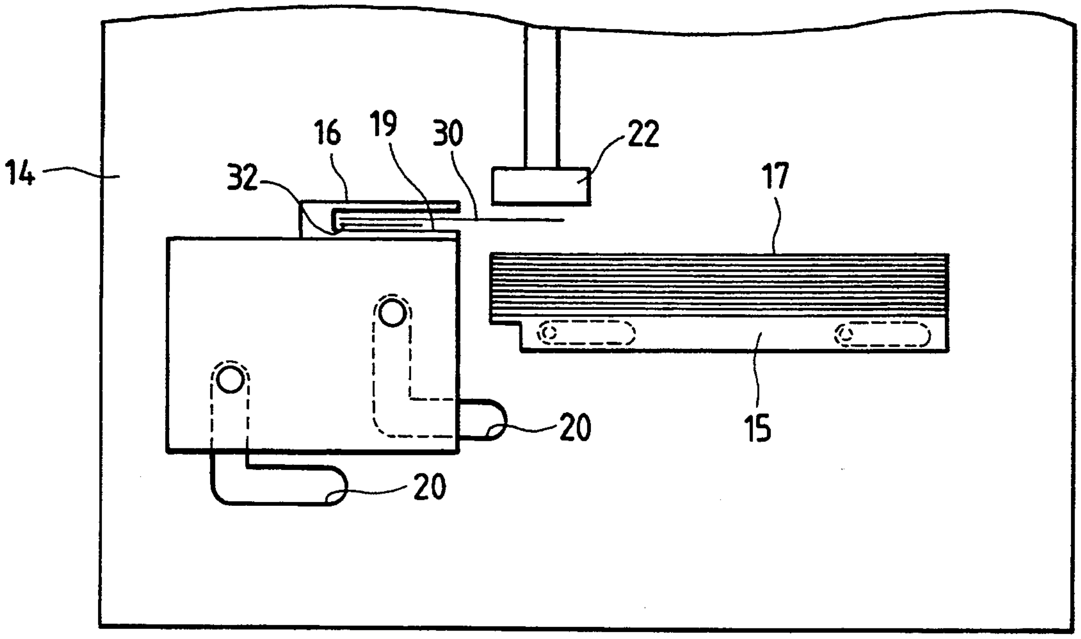
FIG. 2 is a sectional view of the principal part of the aforesaid back pasting apparatus as what is explanatory of its operation.
Figure 3:
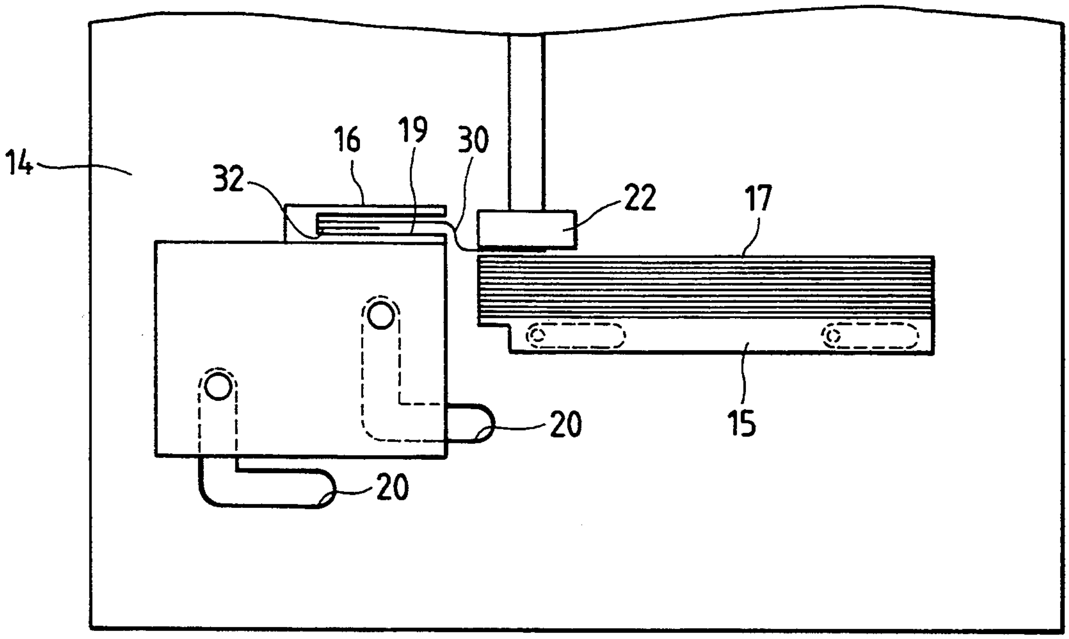
FIG. 3 is a sectional view of the principal part of the aforesaid back pasting apparatus as what is explanatory of its operation.
Figure 4:
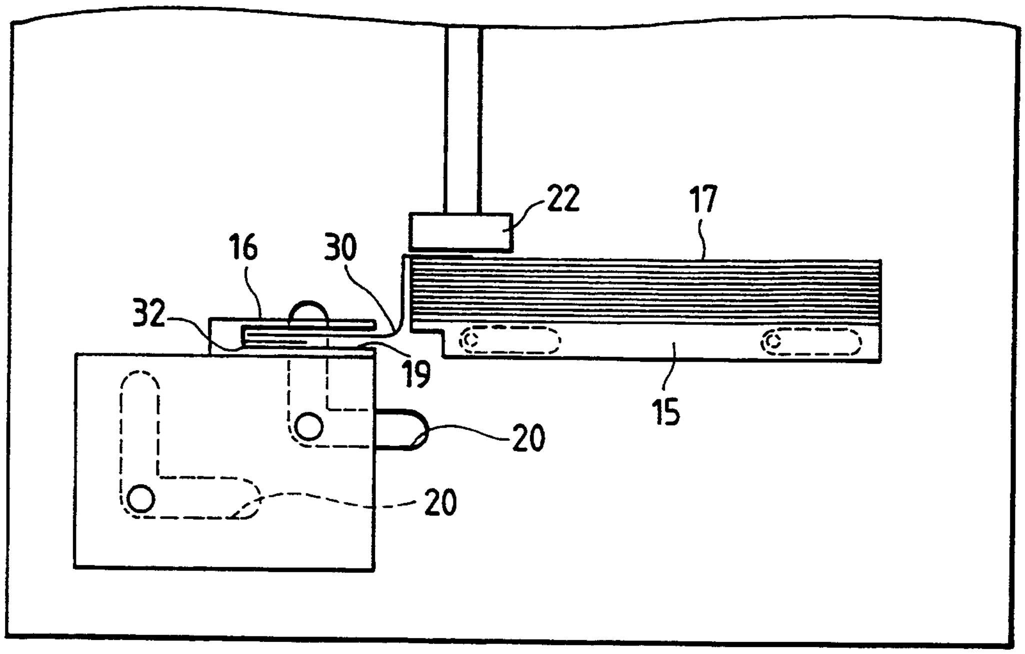
FIG. 4 is a sectional view of the principal part of the aforesaid back pasting apparatus as what is explanatory of its operation.

The clamp 22 is subsequently moved down from the level shown in FIG. 2 and presses the exposed adhesive layer 31 of the adhesive tape 30 against the cover of the papers 17 as shown in FIG. 3. Then the guide rail 16 is, as shown in FIG. 4, moved down by the guide rail drive mechanism 21 and the adhesive tape 30 is pasted on the back of the papers 17. As shown in FIG. 4, the surface of the guide rail 16 and that of the paper table 15 are positioned on the substantially same plane when the guide rail 16 is moved down.

Figure 5:
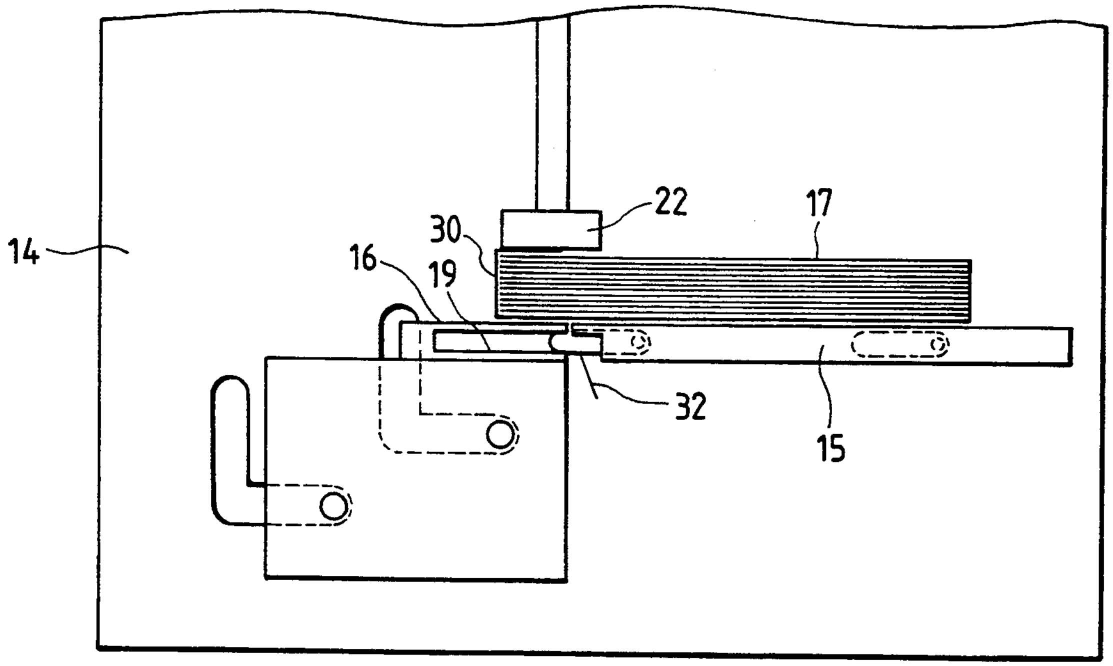
FIG. 5 is a sectional view of the principal part of the aforesaid back pasting apparatus as what is explanatory of its operation.

The guide rail 16 is driven forward with respect to the frame as shown in FIG. 5 so as to move back the paper table 15 while pushing the paper table 15 steadily with its leading end portion. At this time, the papers 17 pressed by the clamp 22 stay stationary. Since one side of the adhesive tape 30 is also pressed by the clamp 22 then, the adhesive tape 30 is pulled out of the guide groove 19 as the guide rail 16 moves. While being bent along the leading end portion of the guide rail 16, the adhesive tape 30 is pulled out. So the adhesive tape 30 is pressed by the surface of the guide rail 16 against the back cover of the papers 17 after the back paper 32 pasted onto the adhesive layer 31 is peeled off.

Since the direction in which the adhesive tape is bent conforms to the direction in which the bending force is applied, the tape is prevented from twisting and its corner which is bent at an acute angle results in improving the finishing quality. Although the guide rail is so adapted as to move down and forward in the embodiment shown, it may be made to move forward while the paper table is raised to carry out back pasting. Needless to say, the present invention also covers such a modified arrangement.

As a detailed description has been given of the embodiment of the present invention above, the back pasting adhesive tape is made to stick to the cover or the back cover of papers, to the back of the papers and up to the other cover. Therefore, unlike the prior art, the width of the apparatus can be decreased because it is unnecessary to move the papers in the longitudinal direction. Since the back pasting adhesive tape is bent from the edge of the cover of the papers via the back thereof up to the back cover before being pressed against them, the tape is prevented from crinkling and twisting. Therefore, the finishing quality is improved.

Moreover, the portions near the back of papers are held tightly between the cover and the back cover thereof and the adhesive tape is pressed against the back of the papers. In consequence, back pasting is uniformly finished, irrespective of the thickness of the papers, and even a small number of sheets of paper can be bound by back pasting readily and effectively instead, for example.

The second embodiment of the present invention will subsequently be described. With this embodiment, however, like reference characters are given to like members which function and operate in the same manner according to the first embodiment of the present invention and the description of these members will be omitted.

Figure 7:
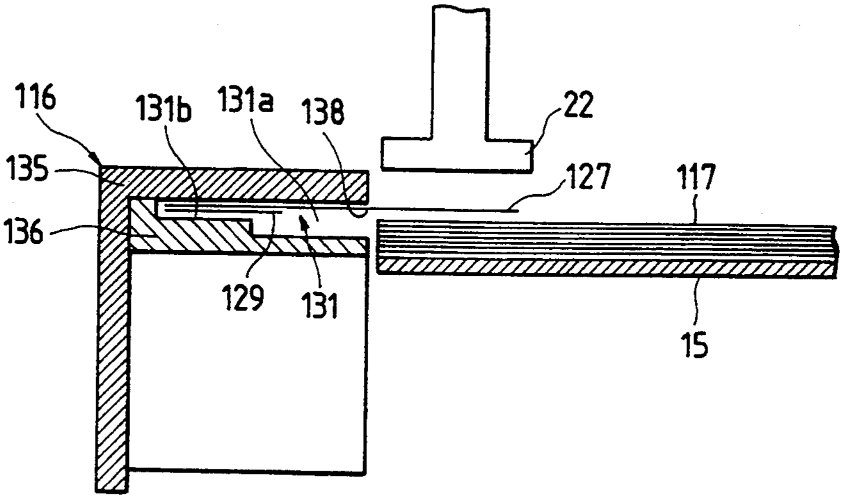
FIG. 7 is a diagram illustrating the operation of a back pasting apparatus according to the second embodiment of the present invention.

A guide rail 116 disposed in the rear of the paper table 15 includes, as shown in FIG. 7, an upper member 135 and a lower member 136 abutting against the undersurface of the upper member 135. A guide wall on the surface of the lower member 136 is formed stepwise in three ways and the width of a guide groove 131 formed with the upper member 135 is made wide from the opening side up to the intermediate point and narrow from the intermediate point to the back portion.

Figure 9:
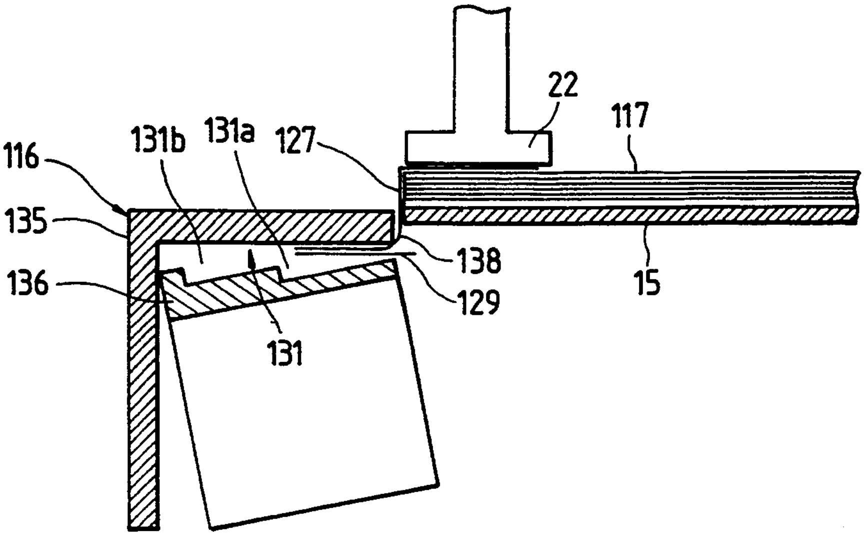
FIG. 9 is a diagram illustrating the operation of the back pasting apparatus according to the second embodiment of the present invention.

The guide rail 116 is moved up and down, and back and forth by the guide rail drive mechanism 21 within a predetermined range and as shown in FIG. 9, it can reduce the width of the opening of the guide groove 131 by swiveling the lower member 136 with respect to the upper member 135. Any other means such as a motor and a link, a solenoid actuator or the like may be applicable to the guide rail drive mechanism 21.

The operation of the back pasting apparatus 11 will subsequently be described. A series of operations covering the feeding of the adhesive tape 127 up to the completion of back pasting are sequentially controlled by the control unit 36. First, a booklet 17 such as a collection of documents is temporarily bound with a stapler and the portion thus temporarily bound is adjusted to the rear edge of the paper table 15 before being mounted thereon. Then the guide table 18 is made to abut against the leftmost side of the booklet 17 as shown in FIG. 1. When an instruction for the start of the operation is given to the control unit 36 via a start switch (not shown), the capstan roller 27 is driven so as to feed into the guide groove 19 of the guide rail 116 an adhesive tape 127 with wide back paper 130 sticking thereto. At this time, the exposed adhesive layer 138 of the adhesive tape 127 is located in the wide portion 131*a* of the guide groove 131, whereas the portion with the back paper 129 sticking thereto is held in the narrow back portion 131*b* as shown in FIG. 7. Therefore, the exposed adhesive layer 138 is prevented from sticking to the lower member 136.

When the leading end of the adhesive tape 127 reaches the position of the tape detection sensor 34, the control unit 36 stops the driving of the capstan roller 27 and by causing the cutter 35 to operate, the adhesive tape 127 is cut to dimensions of the booklet 17.

Figure 8:
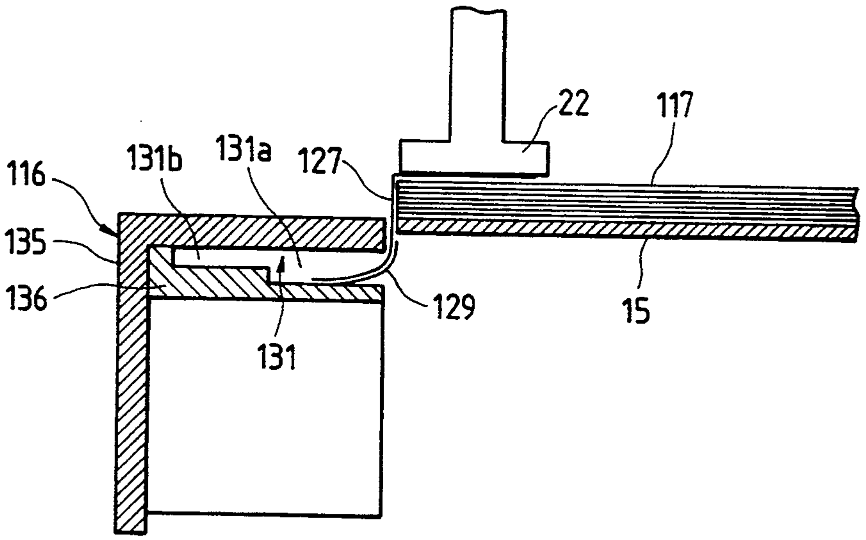
FIG. 8 is a diagram illustrating the operation of the back pasting apparatus according to the second embodiment of the present invention.

The clamp 22 is subsequently moved down from the level shown in FIG. 7 and presses the adhesive tape 127 against the cover of the booklet 17 as shown in FIG. 8. Then the guide rail 116 is, as shown in FIG. 8, moved down by the guide rail drive mechanism 21 and the adhesive tape 127 is pasted on the back of the booklet 17. The guide rail 116 is moved down to the position where the surface of the guide rail 116 substantially conforms in level to that of the paper table 15.

Figure 10:
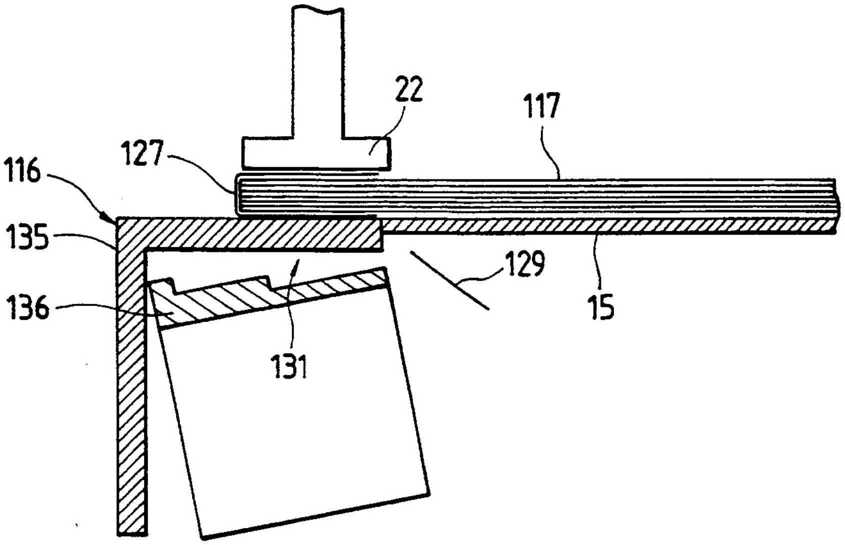
FIG. 10 is a diagram illustrating the operation of the back pasting apparatus according to the second embodiment of the present invention.

The width of the opening of the guide groove 131 is reduced by swiveling the lower member 136 of the guide rail 116 as shown in FIG. 9 and the guide rail 116 is driven forward as shown in FIG. 10 so as to move back the paper table 15 while pushing the paper table 15 steadily with its leading end portion. At this time, the booklet 17 pressed by the clamp 22 stays stationary. Since one side of the adhesive tape 127 is also pressed by the clamp 22 then, the adhesive tape 127 is pulled out of the guide groove 131 as the guide rail 116 moves. While being stroked by the leading end portion of upper member 135 of the guide rail 116, the back paper 129 is peeled off. So the adhesive tape 127 is pressed by the surface of the guide rail 116 against the back cover of the booklet 17.

When the guide rail 16 is moved forward in such a state as shown in FIG. 8, the bending angle of the adhesive tape 127 is not sufficiently made large because the portion to which the back paper of the adhesive tape 127 is pasted is situated in the wide portion 131a of the guide groove 131 and there is the possibility of allowing the back paper 129 to keep sticking to the adhesive tape 127. However, the adhesive tape 127 is sufficiently stroked by reducing the width of the opening of the guide groove 131 and moving the guide rail 16 forward to ensure that the back paper 129 is peeled off. Since the direction in which the adhesive tape is bent conforms to the direction in which the bending force is applied, the tape is prevented from twisting and its corner which is bent at an acute angle ensures high quality finishing.

Figure 11:
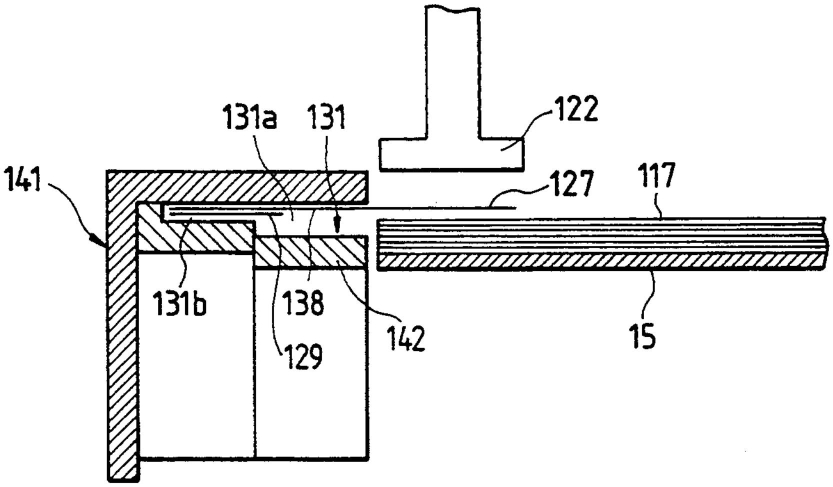
FIG. 11 is a diagram illustrating the operation of a back pasting apparatus according to the third embodiment of the present invention.
Figure 12:
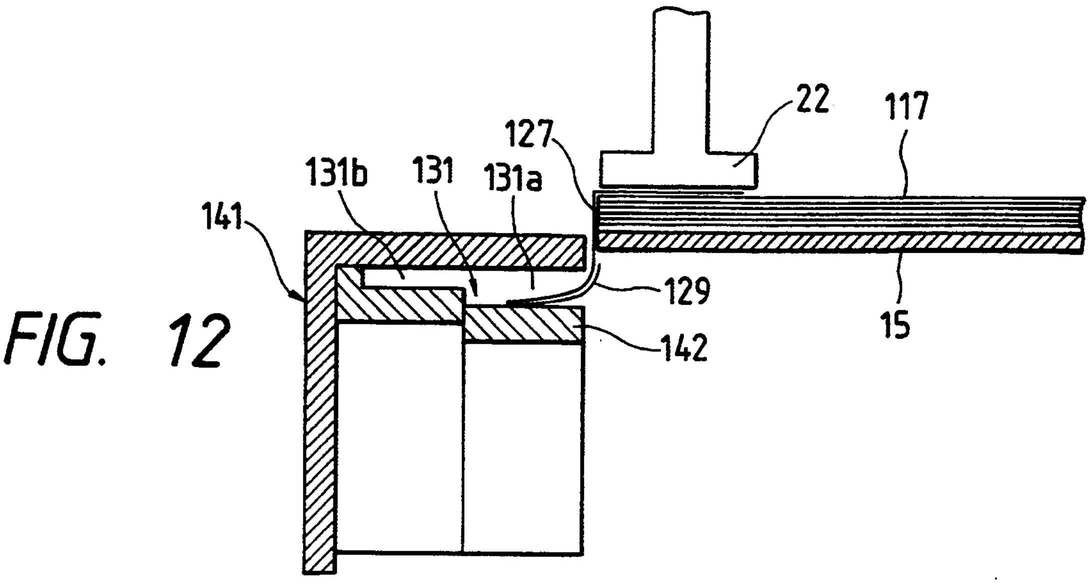
FIG. 12 is a diagram illustrating the operation of the back pasting apparatus according to the third embodiment of the present invention.

FIGS. 11 through 14 inclusive refers to the third embodiment according to which the lower guide plate of a guide rail 141 is divided into two: a front and a back part, and the width of the opening of the guide groove 131 is made variable by making a member 142 on the opening side movable up and down. As shown in FIGS. 11 and 12, the member 142 on the opening side is lowered until the adhesive tape 127 is pasted to the back of the booklet 17 and the width of the opening of the guide groove 131 is enlarged so as to prevent the adhesive tape 127 from sticking thereto.

Figure 13:
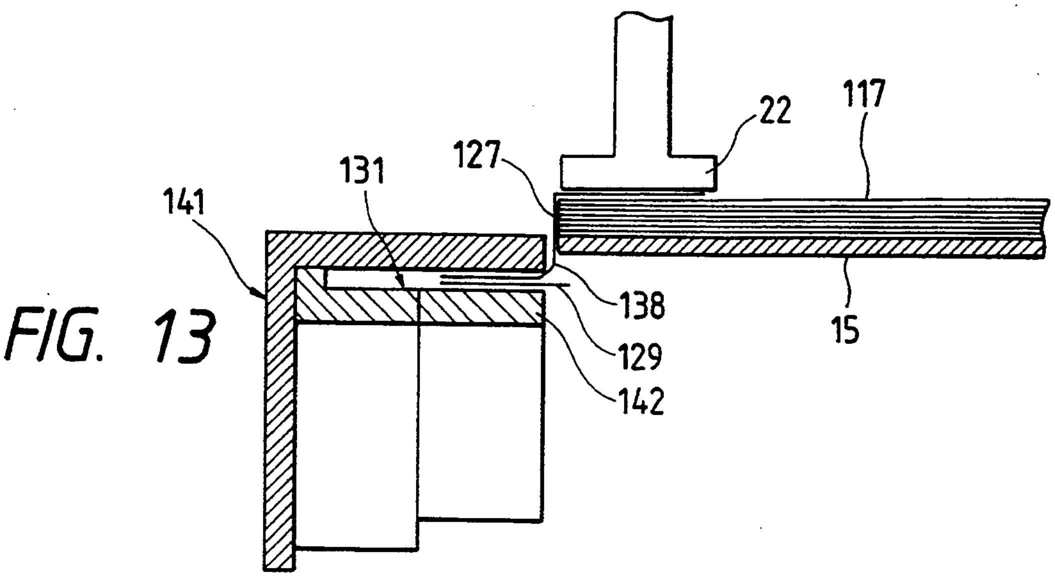
FIG. 13 is a diagram illustrating the operation of the back pasting apparatus according to the third embodiment of the present invention.
Figure 14:
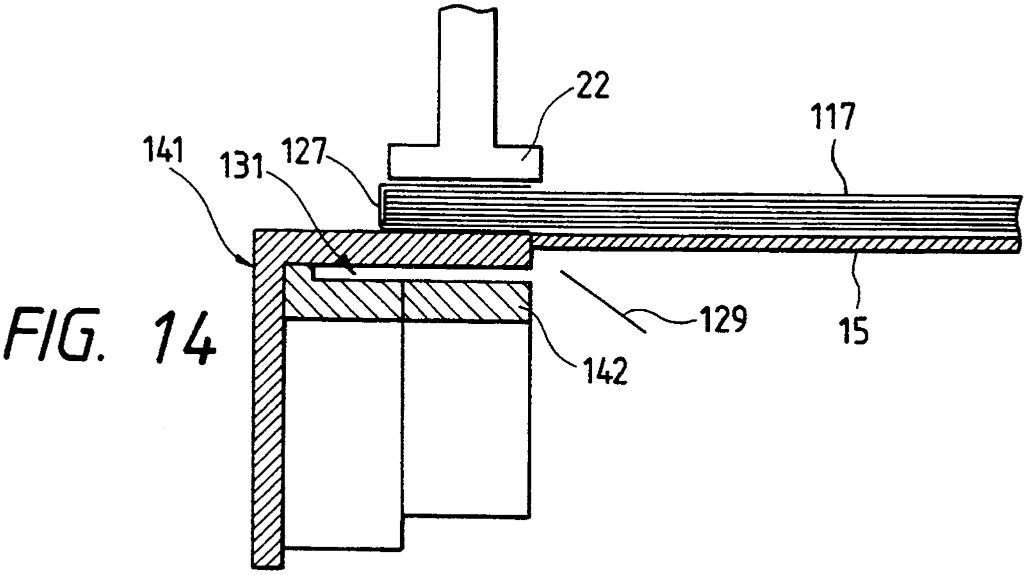
FIG. 14 is a diagram illustrating the operation of the back pasting apparatus according to the third embodiment of the present invention.

The width of the opening is subsequently reduced by raising the member 142 on the opening side as shown in FIG. 13 and while the back paper 129 is being peeled off, the guide rail 141 is moved forward as shown in FIG. 14 so as to press the adhesive tape 127 against the back cover.

Although the guide rails 116 and 141 are so arranged as to move down and forward in the embodiment shown, various modified arrangements are possible in that, for example, the paper table 15 is moved up and the guide rail 116 or 141 is moved forward. Needless to say, the present invention also covers such modified arrangements.

As a detailed description has been given of the embodiment of the present invention above, the back pasting adhesive tape is made to stick to the cover or the back cover of papers, to the back of the papers and then up to the other cover. Therefore, unlike the prior art, the width of the apparatus can be decreased because it is unnecessary to move the papers in the longitudinal direction. Since the back pasting adhesive tape is bent from the edge of the cover of the papers via the back thereof up to the back cover before being pressed against them, the tape is prevented from crinkling and twisting. Therefore, the finishing quality is improved likewise.

Moreover, the portions near the back of papers are held tightly between the cover and the back cover thereof and the adhesive tape is pressed against the back of the papers. In consequence, back pasting is uniformly finished, irrespective of the thickness of the papers, and even a small number of sheets of paper can be bound by back pasting readily and effectively instead, for example.

Figure 15:
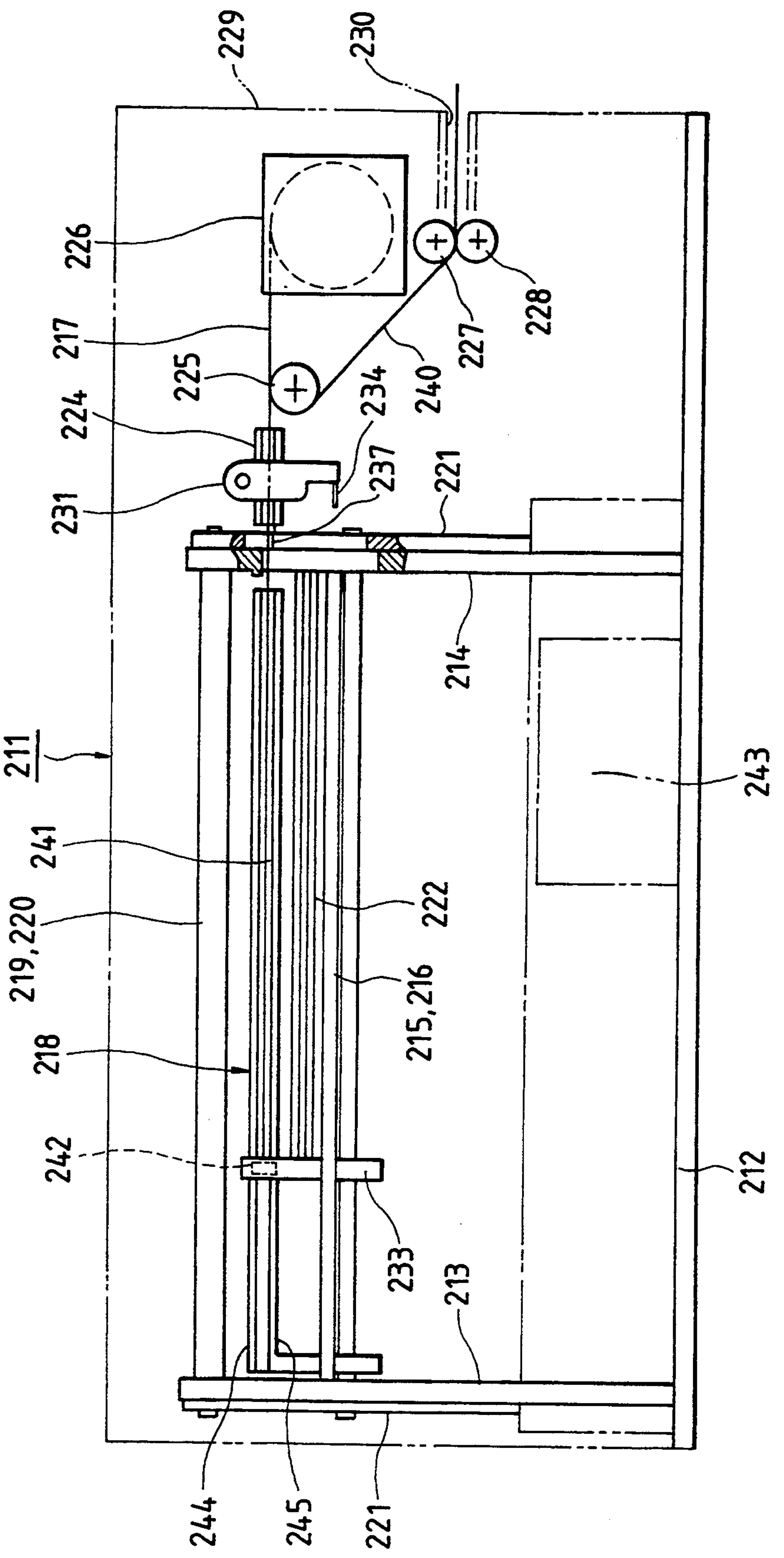
FIG. 15 is an elevational view of the back pasting apparatus according to the third embodiment of the present invention.

Referring to FIG. 15, the third invention of the present invention will subsequently be described in detail. FIG. 15 illustrates a back pasting apparatus 211, wherein numeral 12 denotes a base 212. A fixed table 215, a slide table 216 and a guide rail 218 for an adhesive tape 247 are fitted in order from the front side (this intermediate side in FIG. 15) to both left- and right-hand frames 213, 214 fixedly fitted to the base 212. The slide table 216 is so installed as to slide back and forth within a predetermined range and is biased backward (to the intermediate left-hand side in FIG. 20) by a spring (not shown). The clamps 219, 220 are arranged above the fixed table 215 and the slide table 216, respectively. These clamps 219,220 and the guide rail 218 are fitted into guide grooves (not shown) bored in respective left- and right-hand frames 213, 314, and cam grooves (not shown) in respective left- and right-hand cam plates 221, 221. The clamps 219, 220 move up and down along the respective guide grooves as the cam plates 221, 221 are moved by a motor (not shown) and during the back pasting process as will be described later, they move down from the position indicated in FIG. 15 to tightly hold a booklet 222 with the fixe table 215 and the slide table 216. As shown in FIG. 15, moreover, a laterally slidable guide plate 223 for positioning the booklet 222 is fitted to the left- and right-hand frames 213, 214.

In addition, a fixed guide rail 224, a guide roller 225 and a tape holder 226 are arranged outside the right-hand frame 214. A capstan roller 227, an idler roller 228 and a capstan motor (not shown) are arranged below the tape holder 226. A body cover 229 is also provided with a back paper outlet 230. A cutter arm 231 of FIG. 16 longitudinally striding over the fixed guide rail 224 is turned clockwise and enters holes 232, 233 respectively bored in the cam plate 221 and the frame 214. A cutter blade 234 fitted to the leading end of the cutter arm 231 abuts against a tear-off portion 235 provided at the inside edge of the hole 233 of the frame 214 so as to press-cut an adhesive tape 217 on the inner side of the frame 214.

Figure 16:
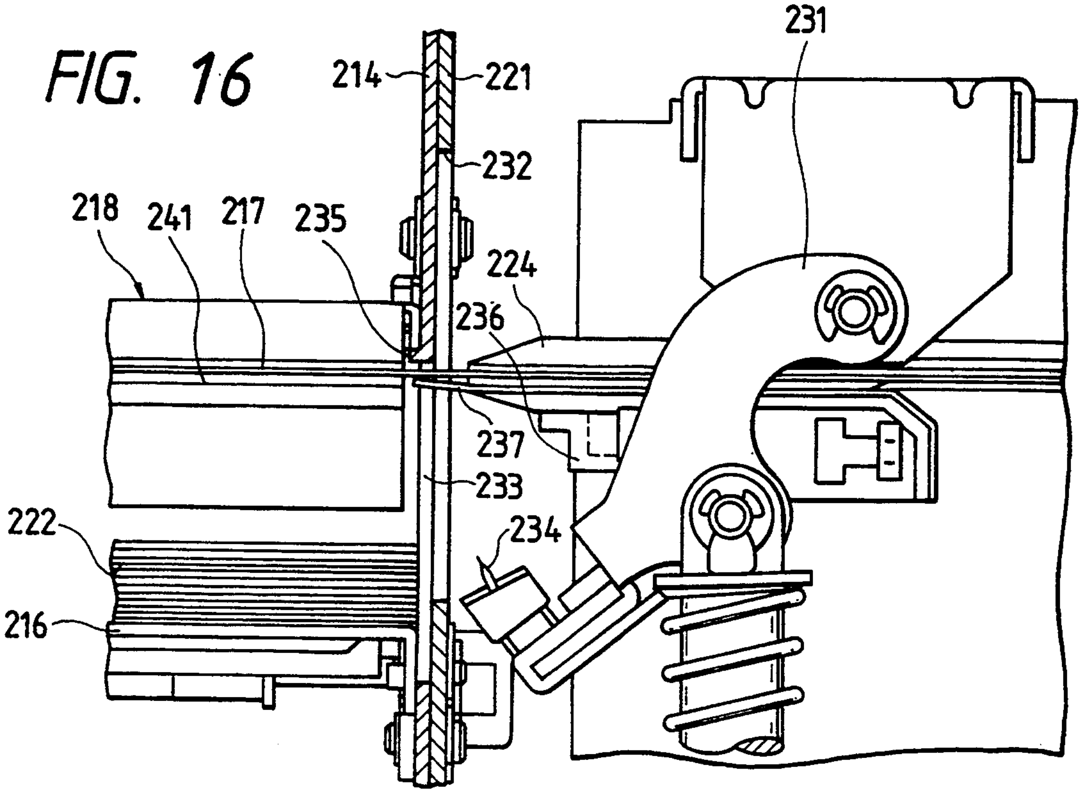
FIG. 16 is a partial sectional view of a fixed guide rail.
Figure 17:
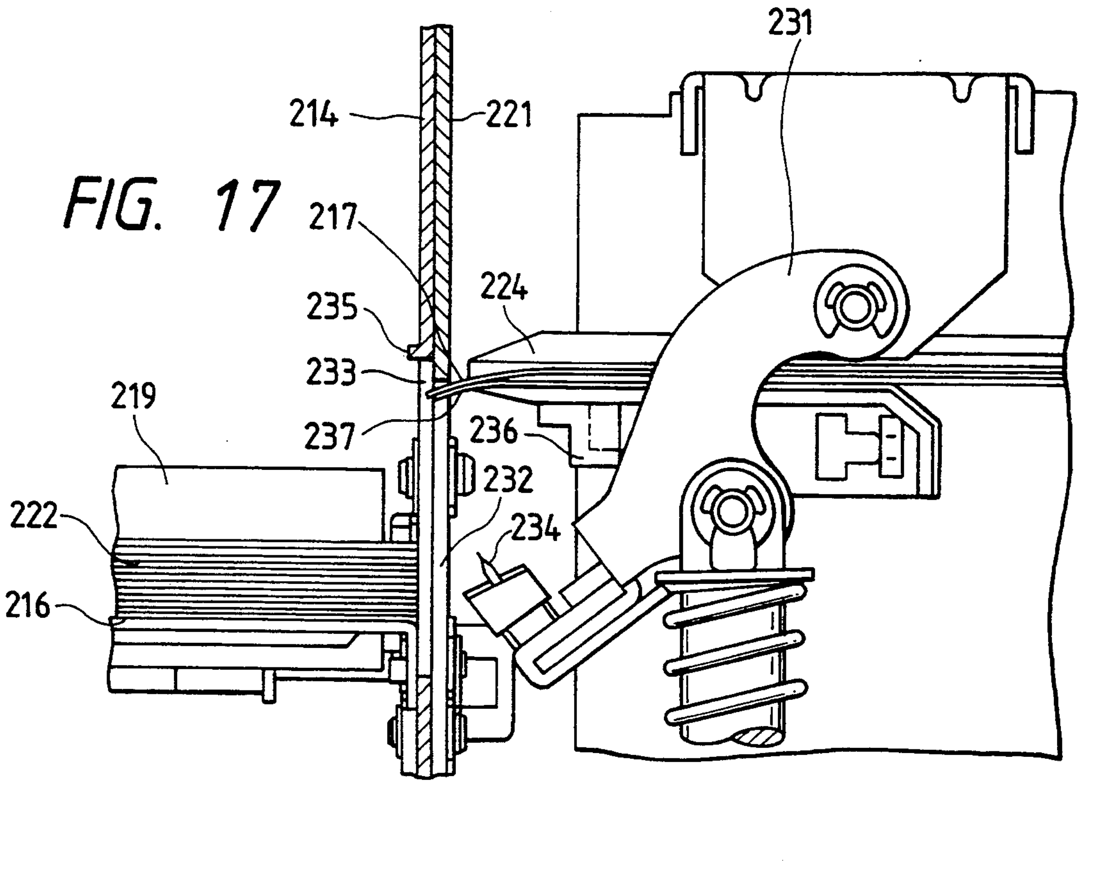
FIG. 17 is a sectional view of the fixed guide rail portion illustrating the bending of an adhesive tape.
Figure 18:
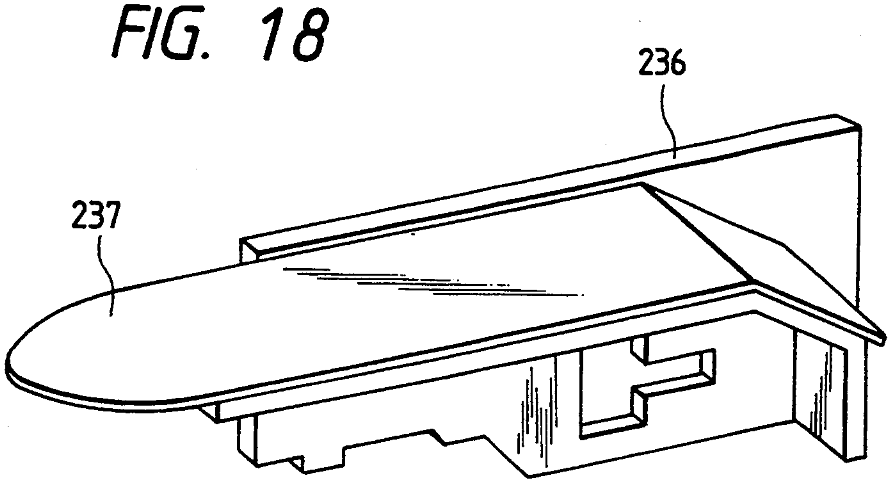
FIG. 18 is a perspective view of a flat spring as a tape guide.

The fixed guide rail 224 is divided into an upper and a lower member and a flat spring 237 is fitted onto the surface of the lower member 236 which is made detachable as shown in FIG. 16. The width of the flat spring 237 is set substantially identical with that of the narrow back paper of the back pasting adhesive tape 217 as will be described later. The entry side of the adhesive tape 217 is secured to the lower member 236, whereas its exit side is made slightly afloat. As shown in FIG. 16, the leading end of the adhesive tape 217 is so arranged as to be positioned near the tear-off portion 235 provided at the inside edge of the hole 233 of the frame 214.

Figure 19:
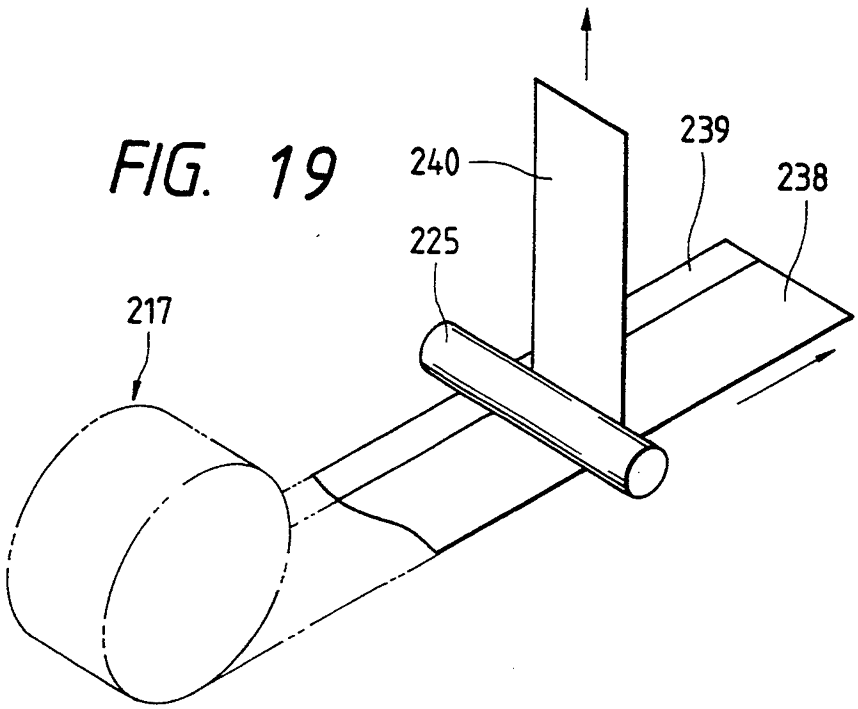
FIG. 19 is a perspective view of a back pasting tape.

The long back pasting adhesive tape 217 wound on the tape holder 226 has two longitudinally-divided back paper parts pasted on an adhesive layer 238 as shown in FIG. 19. The ratio of the width of narrow back paper 239 to that of wide one 240 is set at approximately 1 to 2. The narrow back paper 238 is positioned on the side of the guide rail 218 in such a state that the adhesive tape 217 is set on the tape holder 226, whereas the wide back paper 240 is arranged opposite to the slide table 216.

The leading end of the adhesive tape 217 is pulled out of the tape holder 226. Then only the wide back paper 240 is peeled off the adhesive layer 238 and turned up by the guide roller 225 before being inserted between the capstan roller 227 and the idler roller 228. The leading end of the adhesive tape 217 is inserted in the guide groove 241 of the guide rail 218 via the fixed guide rail 224. When the capstan roller 227 is driven, the adhesive tape 217 together with the back paper 239, 240 is pulled out of the tape holder 226. The adhesive tape 217 is separated from the wide back paper 240 at the position of the guide roller 225 and the adhesive tape 217 with the narrow back paper 239 sticking thereto is fed into the guide groove 241. At this time, as the width of the flat spring 237 fitted to the fixed guide rail 224 is substantially identical with that of the narrow back paper 239 of the adhesive tape 217 as noted previously, the flat spring 237 is prevented from sticking to the exposed adhesive layer of the adhesive tape 217. Then the wide back paper 240 is discharged from the back paper outlet 230.

A tape detection sensor 242 such as a photosensor is provided for the guide plate 223 in contact with the left-hand side of the booklet 222 and when the leading end of the adhesive tape 217 that has been fed reaches the tape detection sensor 242, the capstan roller 227 is stopped. The cutter arm 231 is controlled by a control unit 243 according to the output signal of the tape detection sensor 242 and the adhesive tape 217 is cut at the position of the inside of the right-hand frame 214.

Figure 20:
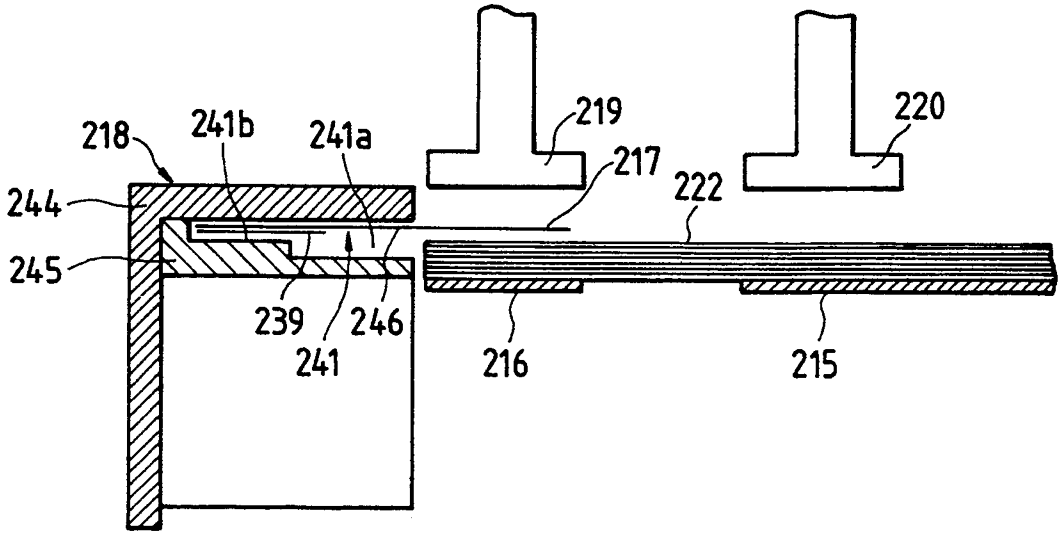
FIG. 20 is a sectional view of the principal part of the back pasting apparatus according to the third embodiment of the present invention as what is explanatory of its operation.

The guide rail 218 arranged in the rear of the slide table 216 includes, as shown in FIG. 20, an upper member 244 and a lower member 245 abutting against the undersurface of the upper member 244. A guide wall on the surface of the lower member 245 is formed stepwise in three ways and the width of a guide groove 241 formed with the upper member 244 is made wide from the opening side up to the intermediate point and narrow from the intermediate point to the back portion.

Figure 22:
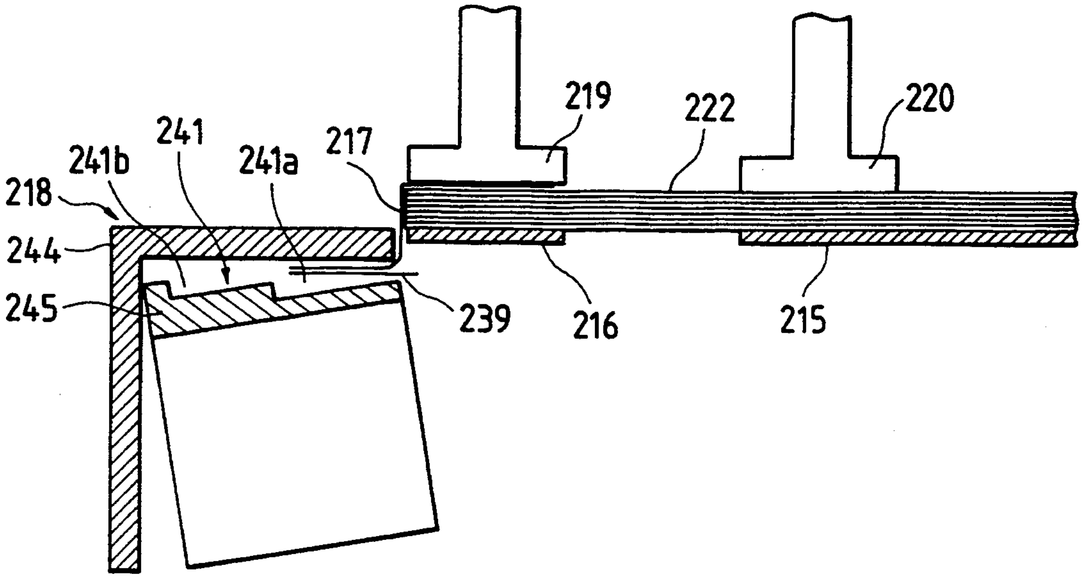
FIG. 22 is a sectional view of the principal part of the back pasting apparatus according to the third embodiment of the present invention as what is explanatory of its operation.

The guide rail 218 is moved up and down, and back and forth by the cam plates 221, 221 within a predetermined range and as shown in FIG. 22, it can reduce the width of the opening of the guide groove 241 by swiveling the lower member 245 with respect to the upper member 244 with the aid of the cam mechanism. Any other means such as a solenoid, an actuator and the like other than a motor and a link, a solenoid actuator and the like may be applicable to the guide rail drive mechanism.

The operation of the back pasting apparatus 211 will subsequently be described. A series of operations covering the feeding of the adhesive tape 217 up to the completion of back pasting are sequentially controlled by the control unit 243. First, the booklet 222 such as a collection of documents is temporarily bound with a stapler and the portion thus temporarily bound is adjusted to the rear edge of the slide table 216 before being mounted thereon. Then the guide table 223 is made to abut against the leftmost side of the booklet 222 as shown in FIG. 15. When an instruction for the start of the operation is given to the control unit 243 via a start switch (not shown), the capstan roller 227 is driven so as to feed into the guide groove 241 of the guide rail 218 the adhesive tape 217 with the wide back paper 240 sticking thereto. At this time, the exposed adhesive layer 246 of the adhesive tape 217 is located in the wide portion 241*a* of the guide groove 241, whereas the portion with the back paper 239 sticking thereto is held in the narrow back portion 241*b* as shown in FIG. 20. Therefore, the exposed adhesive layer 246 is prevented from sticking to the lower member 245.

When the leading end of the adhesive tape 217 reaches the position of the tape detection sensor 242, the control unit 243 stops the driving of the capstan roller 227 and by causing the cutter arm 231 to swivel, the adhesive tape 217 is cut to dimensions of the booklet 222.

Figure 21:
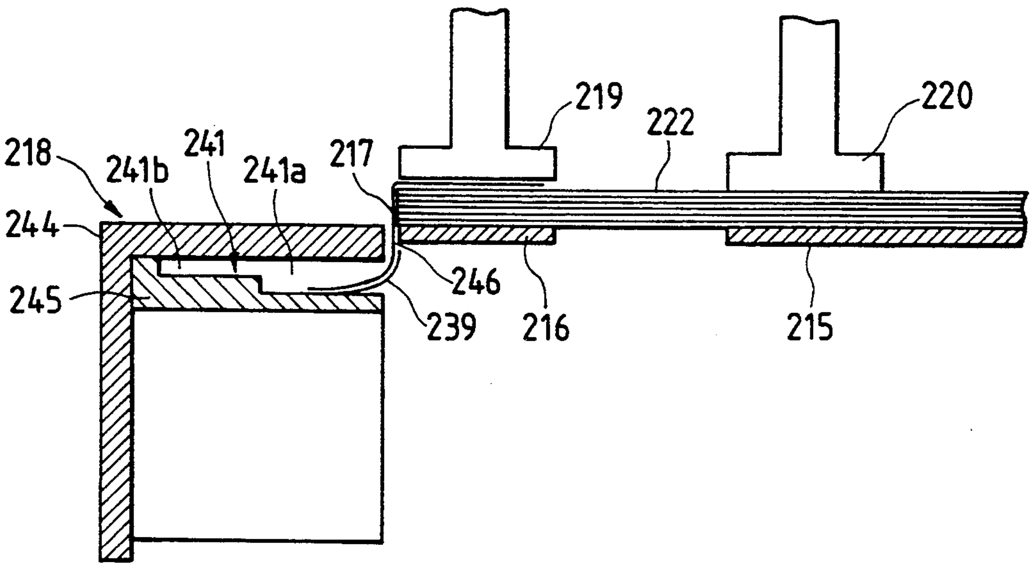
FIG. 21 is a sectional view of the principal part of the back pasting apparatus according to the third embodiment of the present invention as what is explanatory of its operation.

The clamps 219, 220 are subsequently moved down from the level shown in FIG. 20 and presses the adhesive tape 127 against the cover of the booklet 222 as shown in FIG. 21. Then the guide rail 218 is, as shown in FIG. 21, moved down by the cam mechanism and the adhesive tape 217 is pasted on the back of the booklet 222. The guide rail 218 is moved down to the position where the surface of the guide rail 218 substantially conforms in level to that of the guide table 216. As the cam plate 221 moves, the leading end of the adhesive tape 217 on the supply side and the flat spring 237 are bent down by the edge of the hole 232 of the cam plate 221.

Figure 23:
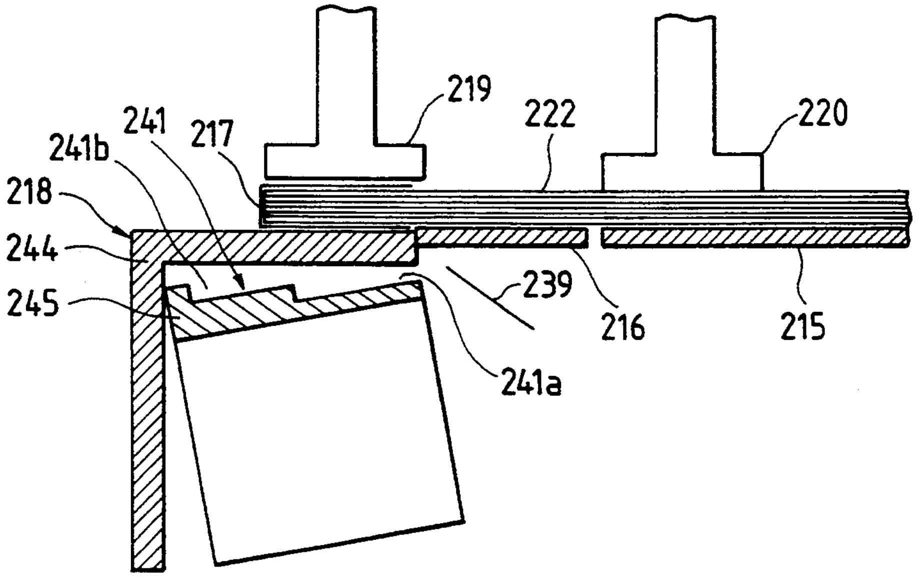
FIG. 23 is a sectional view of the principal part of the back pasting apparatus according to the third embodiment of the present invention as what is explanatory of its operation.

The width of the opening of the guide groove 241 is reduced by swiveling the lower member 245 of the guide rail 218 as shown in FIG. 22 and the guide rail 218 is driven forward as shown in FIG. 23 so as to move back the slide table 216 while pushing the slide table 216 steadily with its leading end portion. At this time, the booklet 222 pressed by the clamp 220 against the fixed table 215 stays stationary. Since one side of the adhesive tape 217 is also pressed by the clamp 219 then, the adhesive tape 217 is pulled out of the guide groove 241 as the guide rail 218 moves. While being stroked by the corner of the upper member 244 of the guide rail 218, the narrow back paper 239 is peeled off. So the adhesive tape 217 is pressed by the surface of the guide rail 218 against the back cover of the booklet 222.

When the cam plates 221,221 are reset, the guide rail 218 and the clamps 219,220 returns to the initial position and simultaneously the flat spring 237 that has been bent down by the edge of the hole 232 of the right-hand cam plate 221 is reset to the state shown in FIG. 20. The leading end of the adhesive tape 217 on the supply side is directed to the guide groove 241 of the guide rail 218 together with the flat spring 237. Consequently, the adhesive tape 217 can be fed into the guide groove 241 of the guide rail 218 with certainty when the feeding of the tape is started during the following back pasting operation.

Incidentally, the shape of the flat spring 237 is not limited to what has been shown in the embodiment above but may be varied if necessary. Needless to say, the present invention also covers such modified arrangements.

According to the embodiment of the present invention that has been described in detail, the leading end of the adhesive tape on the supply side is directed to the guide groove of the guide rail after the back pasting operating is terminated to ensure that the adhesive tape can be fed into the guide groove during the following back pasting operation. In other words, there is no fear of making tape feeding difficult because of the bending of the adhesive tape. Stability and reliability are thus improved.

When the guide rail 218 is moved forward in such a state as shown in FIG. 21, the bending angle of the adhesive tape 217 is not sufficiently made large because the portion to which the back paper of the adhesive tape 217 is pasted is situated in the wide portion 241*a* of the guide groove 241 and there is the possibility of allowing the back paper 239 to keep sticking to the adhesive tape 217. However, the adhesive tape 217 is sufficiently stroked by reducing the width of the opening of the guide groove 241 and moving the guide rail 218 forward to ensure that the back paper 239 is peeled off. Since the direction in which the adhesive tape is bent conforms to the direction in which the bending force is applied, the tape is prevented from twisting and its corner which is bent at an acute angle ensures high quality finishing.

Although the guide rail 218 is so arranged as to move down in the embodiment shown, various modified arrangements are possible in that, for example, the slide table 216 is moved up and so forth. Needless to say, the present invention also covers such modified arrangements.

As a detailed description has been given of the embodiment of the present invention above, the back pasting adhesive tape is made to stick to the cover or the back cover of papers, to the back of the papers and then up to the other cover. Therefore, unlike the prior art, the width of the apparatus can be decreased because it is unnecessary to move the papers in the longitudinal direction. Since the back pasting adhesive tape is bent from the edge of the cover of the papers via the back thereof up to the back cover before being pressed against them, the tape is prevented from crinkling and twisting. Therefore, the finishing quality is improved likewise. Moreover, the portions near the back of papers are held tightly between the cover and the back cover thereof and the adhesive tape is pressed against the back of the papers. In consequence, back pasting is uniformly finished, irrespective of the thickness of the papers, and even a small number of sheets of paper can be bound by back pasting readily and effectively instead. While the back paper is being peeled off by the feed roller, the back pasting adhesive tape is fed into the guide groove of the guide rail, whereas the back paper thus peeled off is discharged from the back paper outlet. Consequently, the back paper is easily processed without causing it to stay idly in the back pasting apparatus.

The fourth embodiment of the present invention will subsequently be described. With this embodiment, like reference characters are given to like members which function and operate in the same manner according to the third embodiment of the present invention and the description of these members will be omitted.

Detectors (not shown) such as stroke sensors or the like as means for detecting the thickness t of the booklet 22 pressed down by the clamps 219, 220 are coupled thereto according to the fourth embodiment. Moreover, the cutter 231 is controlled by the control unit 243 according to the output signal of the tape detection sensor 242. A series of operations covering the feeding of the adhesive tape 217 up to the completion of back pasting are sequentially controlled by the control unit 243.

The memory of the control unit 243 is stored with a reference table of drive pattern data for use in controlling the moving speed of the guide rail 218 during the back pasting operation as will be described later. The drive pattern data corresponding to the thickness t of the booklet 222 is selected so that the guide rail 218 is driven forward.

Figure 24:
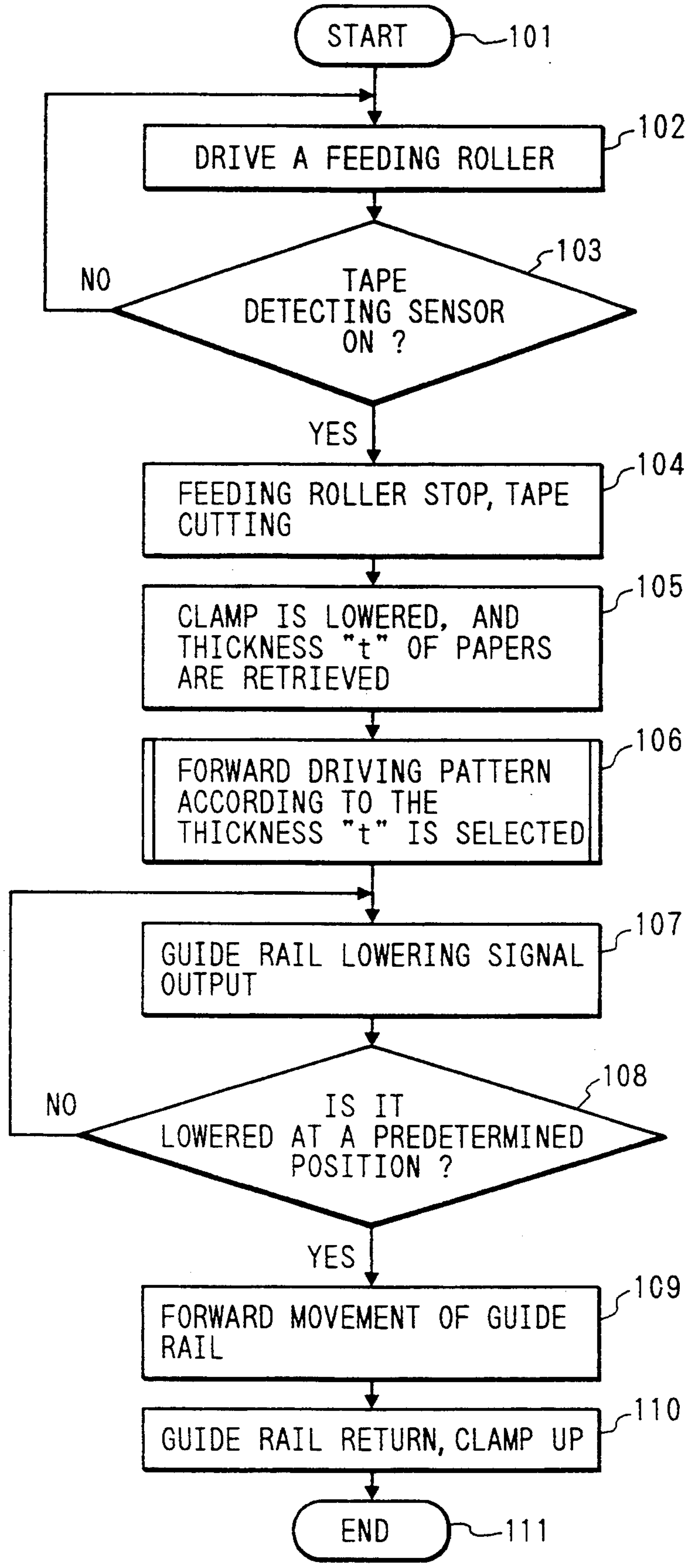
FIG. 24 is a flowchart of the operation of a back pasting apparatus according to the fourth embodiment of the present invention.

Referring to a flowchart of FIG. 24, the operation of the back pasting apparatus 211 will subsequently be described. First, the booklet 222 such as a collection of documents is temporarily bound with a stapler and the portion thus temporarily bound is adjusted to the rear edge of the slide table 216 before being mounted thereon. Then the guide table 223 is made to abut against the leftmost side of the booklet 222 as shown in FIG. 15. When an instruction for the start of the operation is given to the control unit 243 via a start switch (not shown) (Step 101), the capstan roller 227 is driven so as to feed into the guide groove 241 of the guide rail 218 the adhesive tape 217 with the wide back paper 240 sticking thereto (Step 102). At this time, the exposed adhesive layer 246 of the adhesive tape 217 is located in the wide portion **241*a* of the guide groove 241, whereas the portion with the back paper 239 sticking thereto is held in the narrow back portion 241*b* as shown in FIG. 20. Therefore, the exposed adhesive layer 246 is prevented from sticking to the lower member 245**.

When the leading end of the adhesive tape 217 reaches the position of the tape detection sensor 242 (Step 103), the control unit 243 stops the driving of the capstan roller 227 and by causing the cutter 231 to operate, the adhesive tape 217 is cut to dimensions of the booklet 222 (Step 104).

Figure 25:
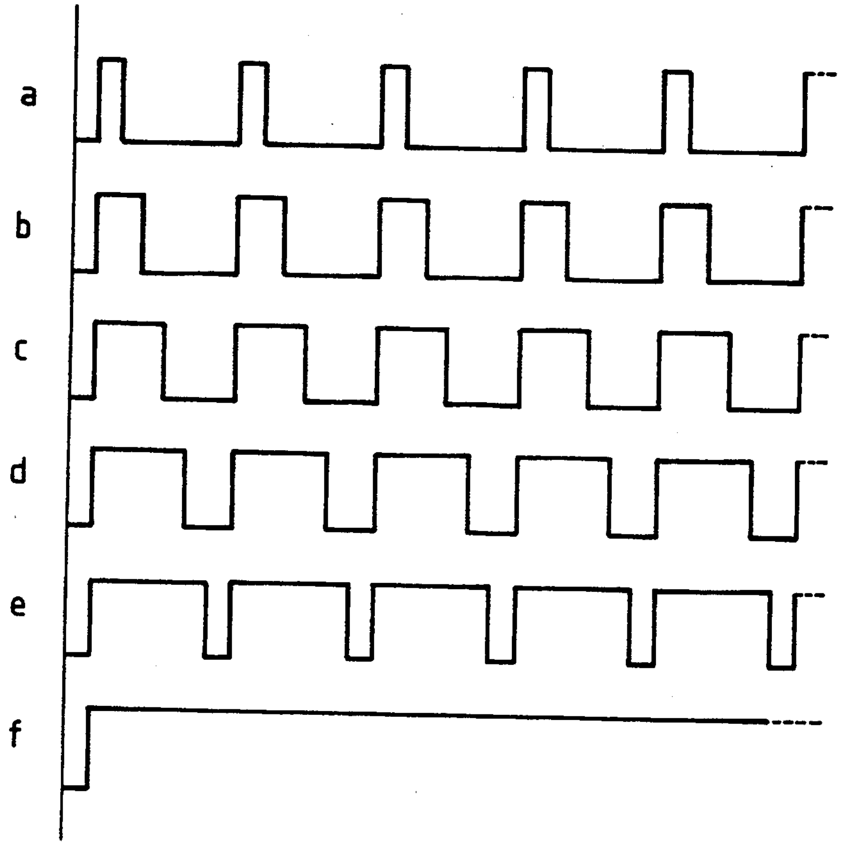
FIG. 25 is a graph showing patterns of a pulse current for use in moving the guide rail forward.
Figure 30:
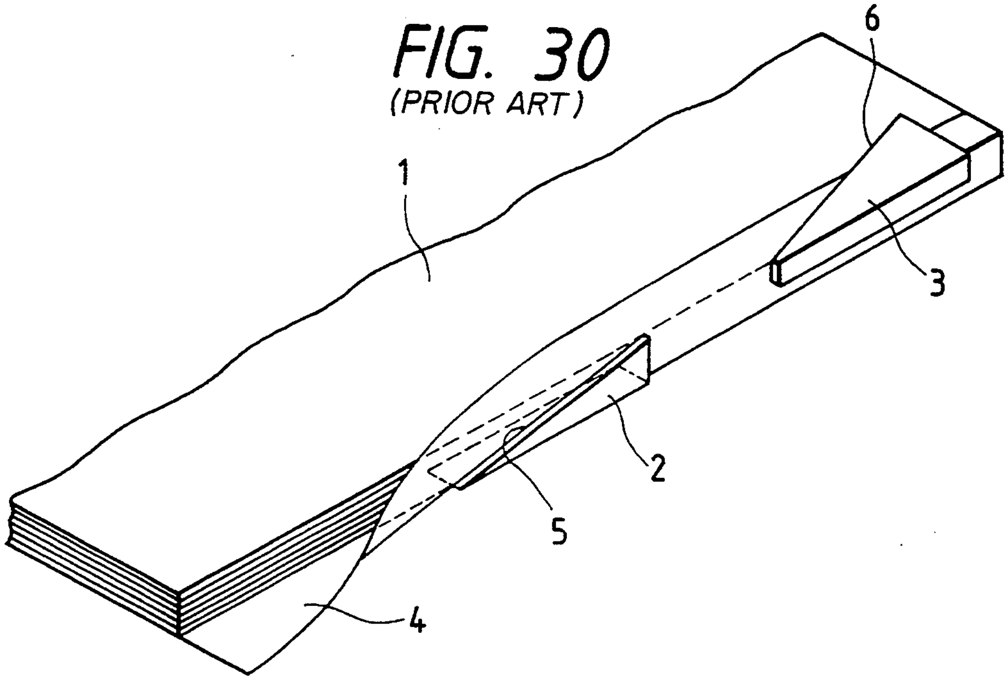
FIG. 30 (PRIOR ART)
FIG. 30 is a diagram explanatory of a guide plate in a conventional back pasting apparatus.
Figure 26:
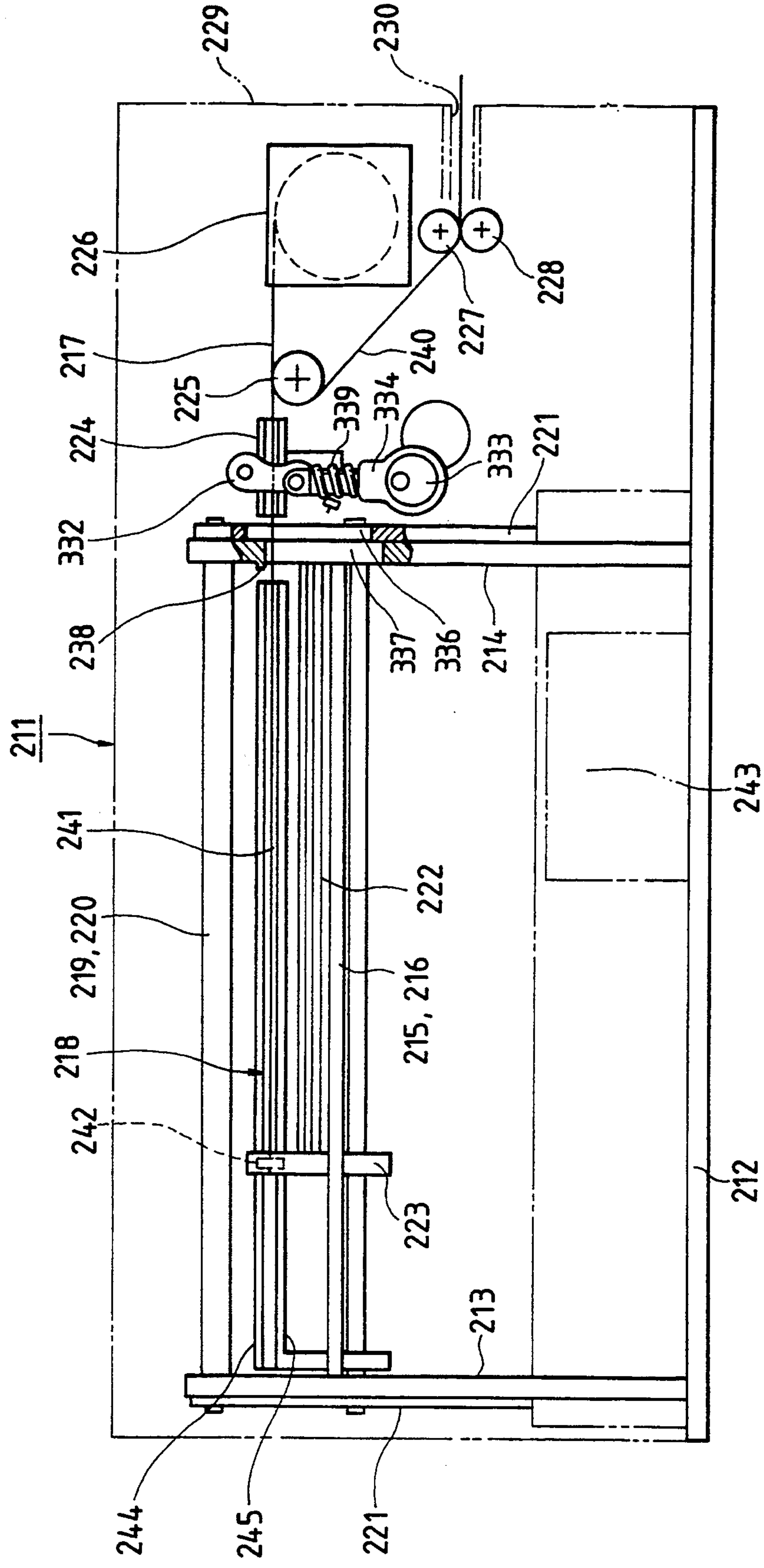
FIG. 26 is an elevational view of the back pasting apparatus according to the fifth embodiment of the present invention.

The clamps 219, 220 are subsequently moved down from the level shown in FIG. 20 and presses the adhesive tape 217 against the cover of the booklet 222 as shown in FIG. 21, the thickness t of the booklet 222 is read into the control unit 243 (Step 105). Then drive pattern data corresponding to the thickness t thus detected is selected and read (Step 106) from, for example, data a, b, . . . , f, that is, n of drive-forward patterns whose duty ratios of drive currents set in accordance with the thickness t are different as shown in FIG. 25. The drive-forward patterns a, b, . . . , f are set in such a way that the ON time Ton of drive pulse current lowers in ratio and that the driving force of the guide rail 218 also lowers as the thickness t of the booklet 222 decreases.

Subsequently, a descent drive signal is output and the guide rail 218 is moved down by the cam mechanism as shown in FIG. 21, whereby the adhesive tape 217 is pasted onto the back of the booklet 222 (Step 107). As shown in FIG. 21, the guide rail 218 is moved down until the surface of the guide rail 218 conforms in level to that of slide table 216. Although the drive voltage, friction in the cam mechanism and the like may cause the descent speed of the guide rail 218 to deviate, use can be made a method of detecting the number of revolutions by fitting a pulse encoder to the drive motor, a sensor for detecting the position of the guide rail 218 and the like to detect the completion of descent of the guide rail 218.

The descent drive signal is stopped at a point of time the descent of the guide rail 218 is completed (Step 108) and the drive pattern data that has been read at Step 106 is output (Step 109). As shown in FIG. 22, the lower member of the guide rail 218 is then swiveled by the cam mechanism so as to reduce the width of the opening of the guide groove 241 and the guide rail 218 is moved forward. As shown in FIG. 23 further, the guide rail 218 thus driven forward pushes and moves back the slide table 216 with its leading end portion. Since the guide rail 218 is moved forward by the drive force corresponding to the thickness t of the booklet 222, the booklet 222 is set free from bending and the one side of the booklet 222 pressed down by the clamp 219 is not moved back. The adhesive tape 217 is thus pulled out of the guide groove 241 as the guide rail 218 moves. While being stroked by the corner of the upper member 244 of the guide rail 218, the adhesive tape 217 is pulled out and its narrow back paper 239 is peeled off. The adhesive tape 217 is thus pressed by the surface of the guide rail 218 against the back cover of the booklet 222.

After the completion of back pasting, the guide rail 218 and the clamp 219 are reset to the initial position (Step 110) to terminate a series of operations (Step 111).

Although the control unit is so arranged as to prestore the plurality of drive pattern data in the embodiment shown, the duty ratio of ON time Ton of the drive pulse to OFF time Toff thereof may be obtained from computation in accordance with the thickness t of the booklet 222. If, moreover, the frequency of the drive pulse is set low, the guide rail 218 may be moved intermittently. Further, the order of supplying the adhesive tape and moving down the clamps and the like is not limited to what has been referred to in the embodiment shown but may be altered in various manners and needless to say, the present invention also covers such modified arrangements.

As a detailed description has been given of the embodiment of the present invention above, the control unit is used to store the thickness t of the booklet such as a collection of documents to be bound and the guide rail is driven forward after the forward drive pattern of the guide rail is obtained in accordance with the thickness t of the booklet. If the booklet is thin, it is driven by low drive force at low speed. Therefore, the thin booklet pressed down by the clamps is prevented from being bent by rapid friction and moved back to ensure that the adhesive tape is pressed against the back cover of the booklet. In the case of a thick booklet without the fear of being bent, back pasting is ensured, irrespective of the thickness of the booklet, while it is being driven by great drive force so as to prevent the processing speed from decreasing as much as possible with the effect of improving the stability and reliability of the performance of such a back pasting apparatus.

The fifth embodiment of the present invention will subsequently be described. With this embodiment, like reference characters are given to like members which function and operate in the same manner according to the fourth embodiment of the present invention and the description of these members will be omitted.

Figure 27:
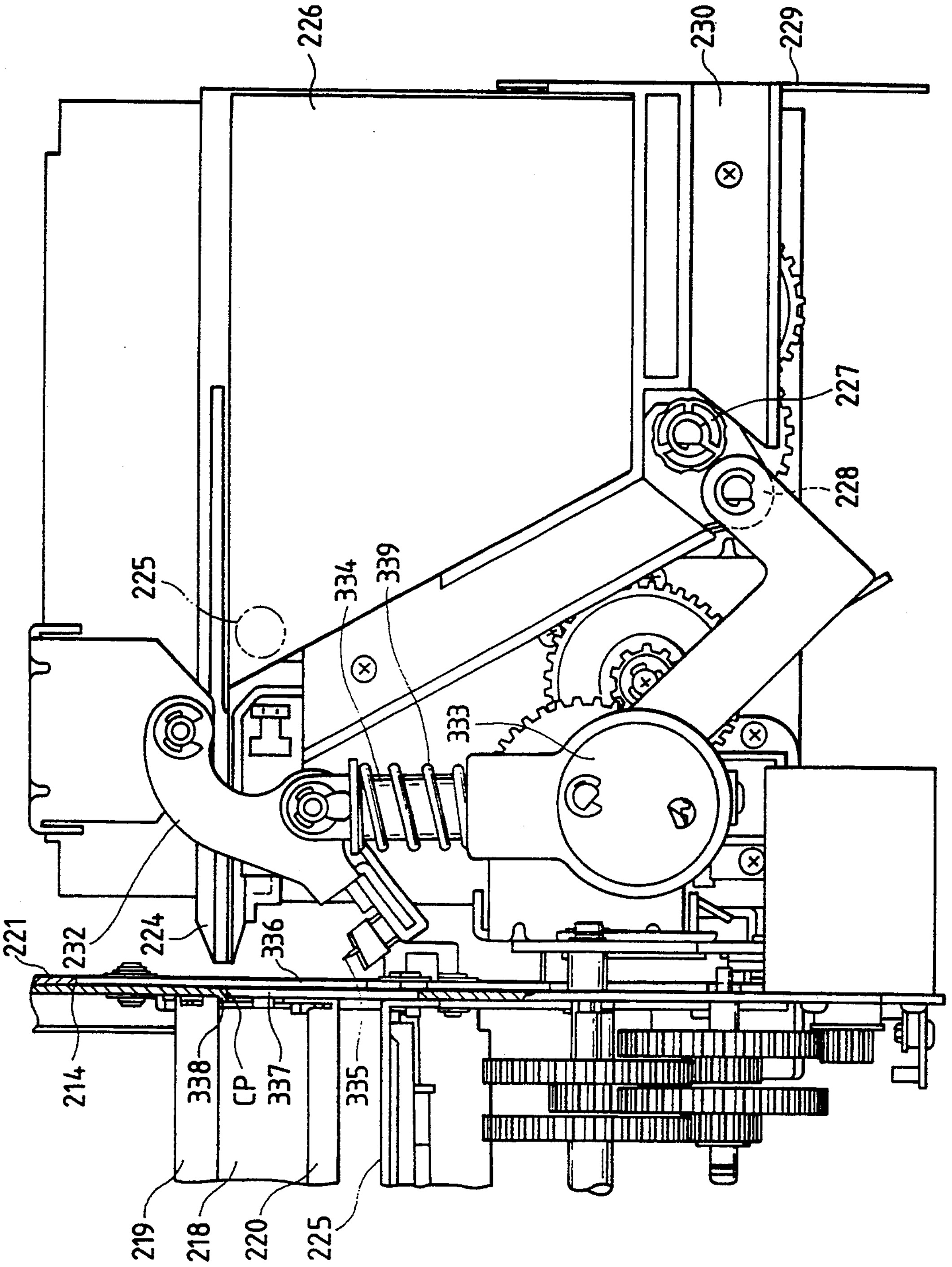
FIG. 27 is an elevational view of a tape cutter portion.

A tape cutter 332 longitudinally striding over the fixed guide rail 224 according to the fifth embodiment is, as shown in FIG. 27, coupled to an eccentric cam 333 as a cutter drive mechanism via a damper link 334 and turned clockwise so that a cutter blade 335 fitted to its leading end portion enters holes 336, 337 respectively bored in the cam plate 221 and the frame 214. The cutter blade abuts against the tear-off portion 235 provided at the inside edge of the hole 337 of the frame 314 so as to press-cut the adhesive tape 217 at a position CP on the inner side of the frame 214. The damper link 334 is biased by a coil spring 339 in the longitudinal direction and contracts when a pressure greater than what has been set for the coil spring 339 is applied thereto so as to limit the pressure contact force of the cutter blade 335.

Figure 28:
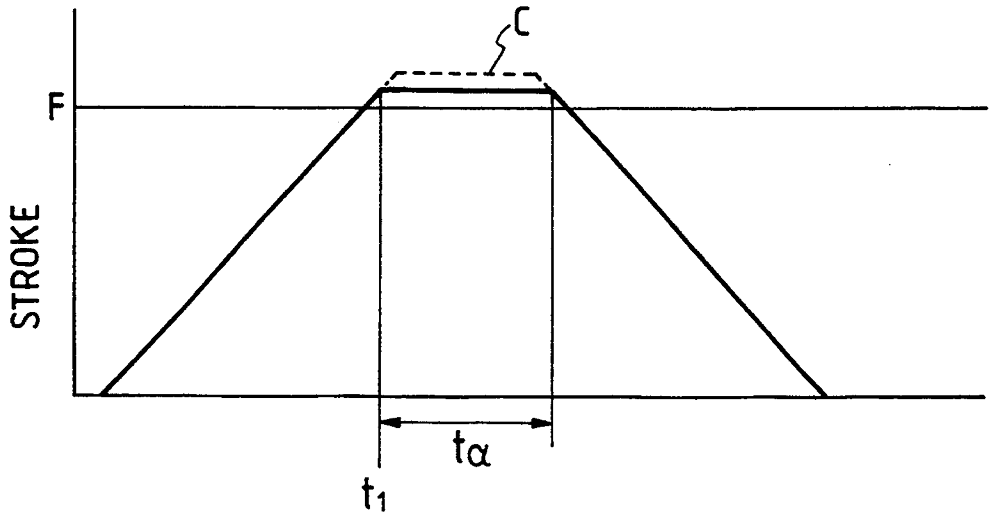
FIG. 28 is a graph showing transitions of the movement of the tape cutter and the cutting load.

The cutter drive mechanism is controlled by the control unit 243 according to the output signal of the tape detection sensor 242. When the cutter blade 335 is forced to contact the tear-off portion of the frame 214 and at a point of time t1 the tape cutter 332 reaches an upper dead point like a cutter stroke line C shown by a dotted line of FIG. 28, the control unit 243 temporarily stops the rotation of the eccentric cam 333. As the shearing force of the cutter blade 335 is limited by the damper link 334 to a predetermined value, the action of the cutting load is held at a predetermined pressure for a predetermined time period $t\alpha$ as shown by an actual line of FIG. 28.

Figure 29:
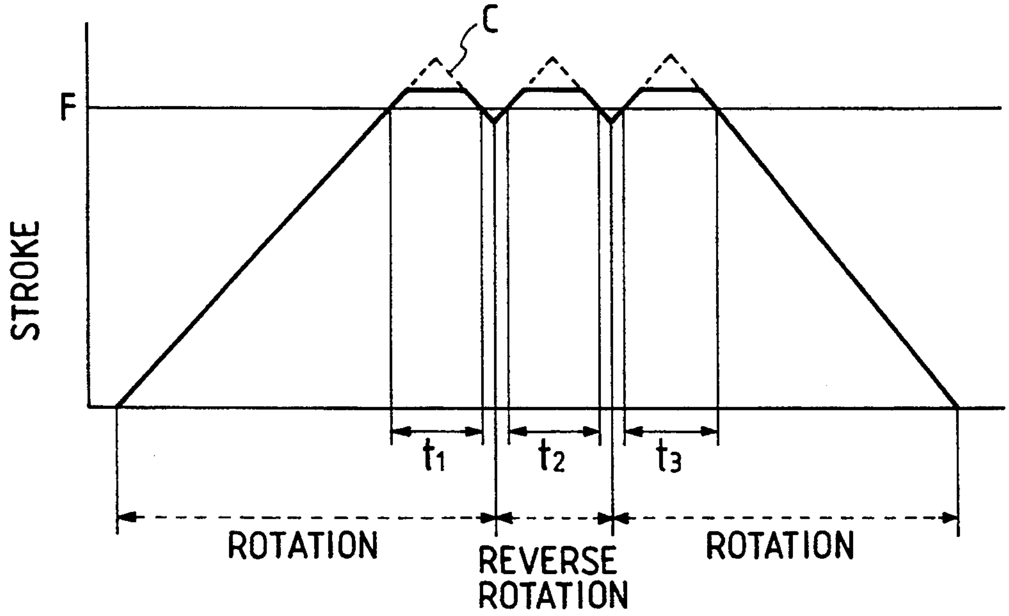
FIG. 29 is a graph showing transitions of the movement of another tape cutter and the cutting load.

FIG. 29 shows another example, wherein the control unit 243 causes the eccentric cam 333 to reverse any given times when the stroke of the tape cutter 332 exceeds the upper dead point and secures the time required to cut the adhesive tape 217 for a total of cutting load time (t1, t2, . . . , tn) by vesting the cutting load intermittently while allowing the stroke thereof to pass through the upper dead point several times.

The present invention is not limited to the embodiment shown above but may be implemented by varying the configuration of the eccentric cam 333 instead of electrical control under the control unit 243 so as to mechanically realize the cam line C shown in FIGS. 29 and 29. Moreover, the tape cutter and the cutter drive mechanism may be modified in various manners and needless to say the present invention covers such modified arrangements.

As a detail description has been given to the embodiment of the present invention above, the cutting load peak can be lowered since the tape cutter is used to cut the adhesive tape by vesting it with the preset cutting load continuously or intermittently for the predetermined time period required to cut the adhesive tape. Therefore, the cutting load time can be secured by limiting the stress of the frame and the tape cutter and this makes it unnecessary to give the frame and the tape cutter a greater rigidity in particular. In other words, the present invention is of practical value in that a back pasting apparatus can be made compact and lightweight.

While the present invention has been described above with several preferred embodiments thereof, it should of course be understood that the present invention should not be limited only to these embodiments but various change or modification may be made without departure from the scope of the present invention as defined by the appended claims.

What is claimed is:

1. A back pasting apparatus comprising:

frames uprightly fitted to a base;

a paper table member installed between said frames;

a guide rail member installed between said frames, said guide rail member having a back pasting adhesive tape guide groove extending in the same direction as that of said guide rail member, the guide groove being arranged opposite a front edge of said paper table member, said guide rail member and said paper table member being horizontally movable, at least one of said guide rail member and said paper table member being vertically movable;

a drive mechanism for situating said guide rail and said paper table member at the substantially same level by moving up and down one of said guide rail member and said paper table member held lower than said guide rail member and also for moving said guide rail member forward; and a clamp installed above the paper table member, the clamp being moveable towards the paper table member, wherein an adhesive tape is made to adhere to upper and lower marginal surfaces of papers disposed on said paper table member, including an edge of said papers between the upper and lower marginal surfaces, in a binding manner such that one side edge of the adhesive tape is disposed in the guide groove of the guide rail member while the other side edge of the adhesive tape is adhesively pressed against said upper marginal surface of papers by said clamp, and said guide rail is moved forward after being lowered relative to said paper table member.

2. A back pasting apparatus according to claim 1, further comprising:

a tape feeder for feeding tape into said guide groove of said guide rail, wherein an adhesive side of the adhesive tape is covered with a back paper which is longitudinally divided into two parts, said tape feeder for feeding the tape while peeling off one of two parts of said back paper is provided, and said tape feeder is driven to feed said adhesive tape with the other parts of the back paper pasted thereon into said guide groove of said guide rail.

3. A back pasting apparatus according to claim 2, said back pasting apparatus including:

a sensor for detecting the feeding amount of the adhesive tape;

a cutter for cutting the adhesive tape; and a control unit for controlling the tape feeder and the cutter according to the value detected by the sensor.

4. A back pasting apparatus according to claim 2, in which said tape feeder comprises a fixed guide rail for guiding the leading end of said adhesive tape with the other parts of the back paper into said guide groove of said guide rail.

5. A back pasting apparatus according to claim 1, in which said guide rail member is longitudinally divided into upper and lower members defining said guide groove therebetween; and a drive mechanism is provided for increasing and decreasing the width of the opening of the guide groove by moving the lower member of the guide rail member with respect to the upper member thereof.

6. A back pasting apparatus according to claim 1, in which said guide rail member is longitudinally divided into upper and lower members defining said guide groove therebetween; said lower member are divided into a front part and a rear part; and a driving mechanism is provided for increasing and decreasing the width of the opening of said guide groove by moving one of said front and rear parts with respect to the upper member up and down.

7. A back pasting apparatus according to claim 5, in which the width of the opening of the guide groove is increased by moving said lower member until the adhesive tape is pasted to the back of the papers so as to prevent the adhesive tape from sticking to said guide rail.

8. A back pasting apparatus according to claim 1, wherein said adhesive tape has a back paper for covering a pasted surface thereof and said back papers are divided into two parts in a longitudinal direction of said tape, said back pasting apparatus including:

a body cover for covering said back pasting apparatus;

a back paper outlet in said body cover of the back pasting apparatus; and rollers means for holding one of back papers of said adhesive tape and sending it to the back paper outlet.

9. A back pasting apparatus according to claim 8, in which while one part of back papers is peeled off, the leading end of the adhesive tape before being inserted in between the rollers, wherein the adhesive tape conveyed interlockingly with the other part of said back papers is fed into the guide groove of the guide rail, and wherein the one part of back papers thus peeled off is discharged from the back paper outlet.

10. A back pasting apparatus according to claim 1, in which said paper table member includes a fixed table and a slide table which is slidable back and forth within a predetermined range and is biased backward.

11. A back pasting apparatus according to claim 4, further comprising:

a cutter for cutting the adhesive tape; and a flat spring attached to said fixed guide rail for guiding the leading end of the adhesive tape into said guide groove of said guide rail member, said flat spring having a leading end which is set near a cutting position of said tape.

12. A back pasting apparatus according to claim 1, further including:

a means for detecting the thickness of the paper and means for controlling the forward drive force of the guide rail in accordance with the thickness thus detected.

13. A back pasting apparatus according to claim 1, further comprising:

a tape cutter control unit including feed rollers for feeding said adhesive tape;

a tape cutter for press-cutting the adhesive tape thus fed; and a cutter drive mechanism for driving said cutter; and a control means for vesting the adhesive tape with a predetermined cutting load intermittently or continuously for a predetermined time period.

14. A method for pasting an adhesive tape onto an edge portion of papers in a back pasting apparatus comprising: a base; frames uprightly fitted to a base; a paper table member installed between the frames; a guide rail member installed between the frames, said guide rail member having a back pasting adhesive tape guide groove extending in the longitudinal direction, the guide groove being arranged in confronted with the front edge of said paper table member, said guide rail member and said paper table member being movable back and forth, at least one of the guide rail member and the paper table member being movable up and down; a drive mechanism for situating the guide rail and the paper table member at the substantially same level by moving up and down one of the guide rail member and the paper table member held lower than the guide rail member and also for moving the guide rail member forward; and a clamp installed above the paper table member, the clamp being freely pressed against the paper table member, wherein an adhesive tape is made to stick to the back of papers and the margin of the upper and lower surface of said papers resting on the paper table member, said method comprising the steps of:

holding one side edge of the adhesive tape in the guide groove of the guide rail;

pressing the other side edge of the adhesive tape against an upper side edge of the papers on the paper table member by means of the clamp; and moving the guide rail forward relative to the paper table member after lowering the guide rail relative to the paper table member.

15. A method for bindingly applying an adhesive tape segment onto a stacked plurality of paper sheets, comprising the steps of:

holding a first side edge of said tape segment in a tape guide member which is moveable relative to said stacked paper sheets;

pressing a second side edge against an upper marginal edge of said stacked paper sheets in an adhering manner;

causing relative movement of said tape segment in a downward direction relative to said stacked paper sheets; and causing relative movement of said tape segment towards said stacked paper sheets such that said first side edge of said tape segment is pulled away from said tape guide member and adheringly applied to a lower marginal edge of said stacked paper sheets.

* * * * *